United States Patent
Nandy et al.

(10) Patent No.: US 10,540,970 B2
(45) Date of Patent: Jan. 21, 2020

(54) ARCHITECTURES AND TOPOLOGIES FOR VEHICLE-BASED, VOICE-CONTROLLED DEVICES

(71) Applicant: Amazon Technologies, Inc., Seattle, WA (US)

(72) Inventors: Dibyendu Nandy, San Ramon, CA (US); Rangaprabhu Parthasarathy, San Jose, CA (US); Snehal G. Joshi, Sunnyvale, CA (US); Arvind Mandhani, San Francisco, CA (US); Dhananjay Motwani, Milpitas, CA (US); Hans Edward Birch-Jensen, San Jose, CA (US); Ambika Pajjuri, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 15/838,878

(22) Filed: Dec. 12, 2017

(65) Prior Publication Data
US 2019/0180740 A1    Jun. 13, 2019

(51) Int. Cl.
*G10L 15/22* (2006.01)
*G10L 15/08* (2006.01)
(Continued)

(52) U.S. Cl.
CPC ............. *G10L 15/22* (2013.01); *G10L 13/02* (2013.01); *G10L 15/08* (2013.01); *G10L 19/167* (2013.01); *H04W 4/80* (2018.02); *H04L 12/28* (2013.01)

(58) Field of Classification Search
CPC ....................... G10L 15/30; H04M 1/6083
See application file for complete search history.

(56) References Cited

U.S. PATENT DOCUMENTS 9,001,801 B2 * 4/2015 Hillyard ............ H04W 52/0251
                                                        370/338
9,171,546 B1   10/2015 Pike
                    (Continued)

FOREIGN PATENT DOCUMENTS

JP          2015002394           1/2015

OTHER PUBLICATIONS

The PCT Search Report and Written Opinion dated Mar. 19, 2019 for PCT Application No. PCT/US2018/063984, 13 pages.
(Continued)

*Primary Examiner* — Brian L Albertalli
(74) *Attorney, Agent, or Firm* — Lee & Hayes, P.C.

(57) ABSTRACT

This disclosure describes, in part, techniques for implementing voice-enabled devices in vehicle environments to facilitate voice interaction with vehicle computing devices. Due to the differing communication capabilities of existing vehicle computing devices, the techniques described herein describe different communication topologies for facilitating voice interaction with the vehicle computing devices. In some examples, the voice-enabled device may be communicatively coupled to a user device, which may communicate with a remote speech-processing system to determine and perform operations responsive to the voice commands, such as conducting phone calls using loudspeakers of the vehicle computing device, streaming music to the vehicle computing device, and so forth. In this way, the communication topologies between the voice-enabled computing device, the vehicle computing device, and the user device provide for voice control of vehicle computing devices which may otherwise be unable to be controlled by voice commands.

20 Claims, 15 Drawing Sheets

(51) Int. Cl.
*G10L 19/16* (2013.01)
*G10L 13/02* (2013.01)
*H04W 4/80* (2018.01)
*H04L 12/28* (2006.01)

(56) References Cited

U.S. PATENT DOCUMENTS

| | | | | |
|---|---|---|---|---|
| 9,389,831 | B2 | 7/2016 | Parundekar et al. | |
| 2002/0197955 | A1* | 12/2002 | Witkowski | G07C 5/008 455/41.1 |
| 2004/0214525 | A1* | 10/2004 | Ahn | G10H 1/0058 455/41.2 |
| 2005/0143134 | A1* | 6/2005 | Harwood | H04M 1/271 455/563 |
| 2007/0005368 | A1* | 1/2007 | Chutorash | B60R 16/0373 704/275 |
| 2007/0140187 | A1* | 6/2007 | Rokusek | H04L 67/16 370/338 |
| 2009/0298428 | A1 | 12/2009 | Shin | |
| 2012/0149365 | A1* | 6/2012 | Ying | G08G 1/096716 455/426.1 |
| 2013/0185072 | A1* | 7/2013 | Huang | G10L 15/30 704/246 |
| 2013/0288606 | A1* | 10/2013 | Kirsch | H04M 1/6091 455/41.3 |
| 2014/0066132 | A1* | 3/2014 | Burke | H04L 67/12 455/569.2 |
| 2014/0120892 | A1* | 5/2014 | Martin | G10L 15/22 455/418 |
| 2014/0357248 | A1* | 12/2014 | Tonshal | H04M 1/6091 455/418 |
| 2015/0066479 | A1 | 3/2015 | Pasupalak et al. | |
| 2015/0105020 | A1 | 4/2015 | Aida | |
| 2016/0119961 | A1* | 4/2016 | Hrabak | H04B 1/3822 455/41.2 |
| 2016/0325677 | A1 | 11/2016 | Fitch et al. | |
| 2018/0204570 | A1* | 7/2018 | Puranik | G10L 15/22 |
| 2018/0293982 | A1 | 10/2018 | Xiang et al. | |
| 2018/0299289 | A1 | 10/2018 | Hill et al. | |

OTHER PUBLICATIONS

Office Action for U.S. Appl. No. 15/838,969, dated Jun. 3, 2019, Parthasarathy, "Architectures and Topologies for Vehicle-Based, Voice-Controlled Devices", 24 pages.

* cited by examiner

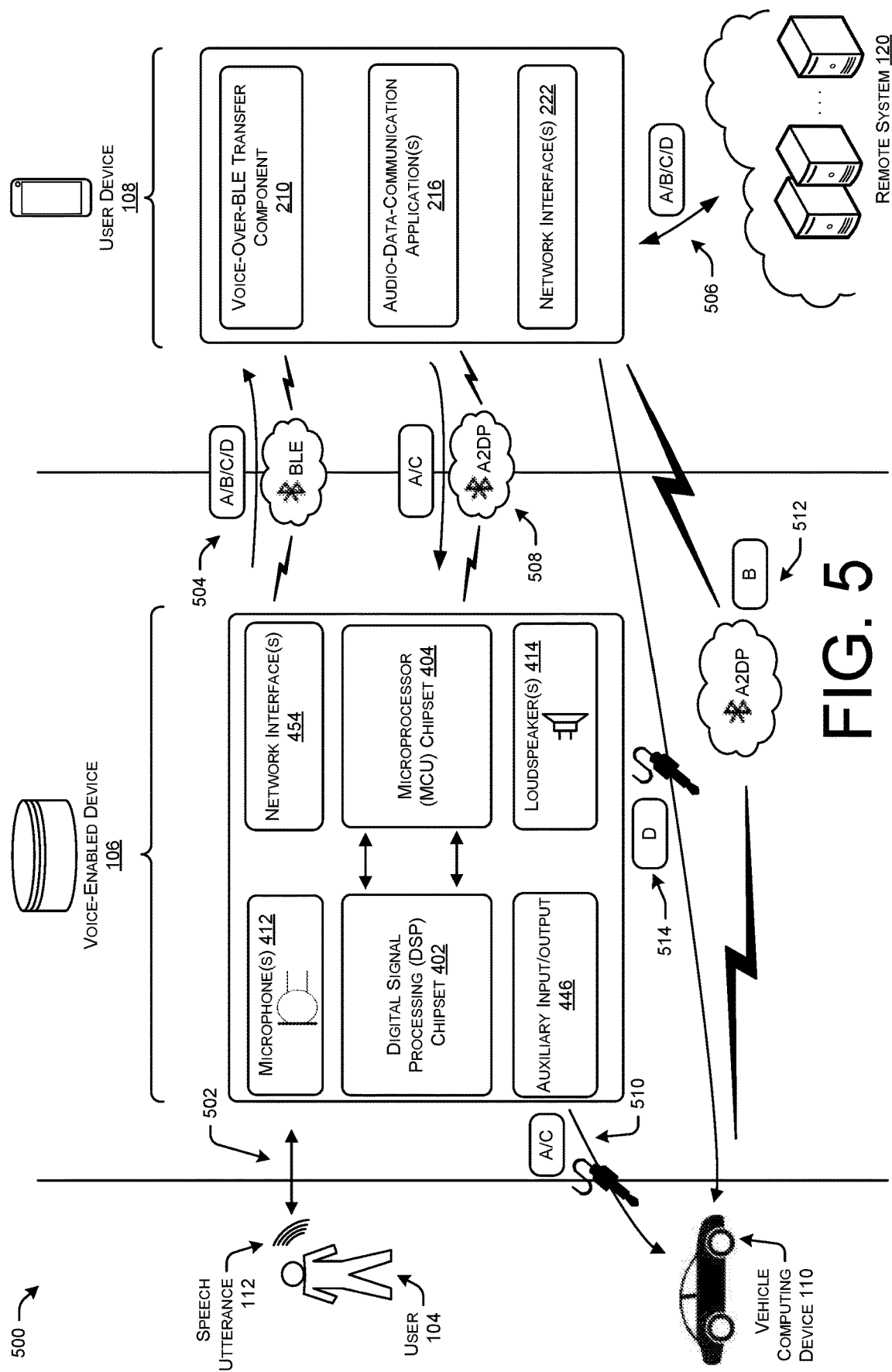

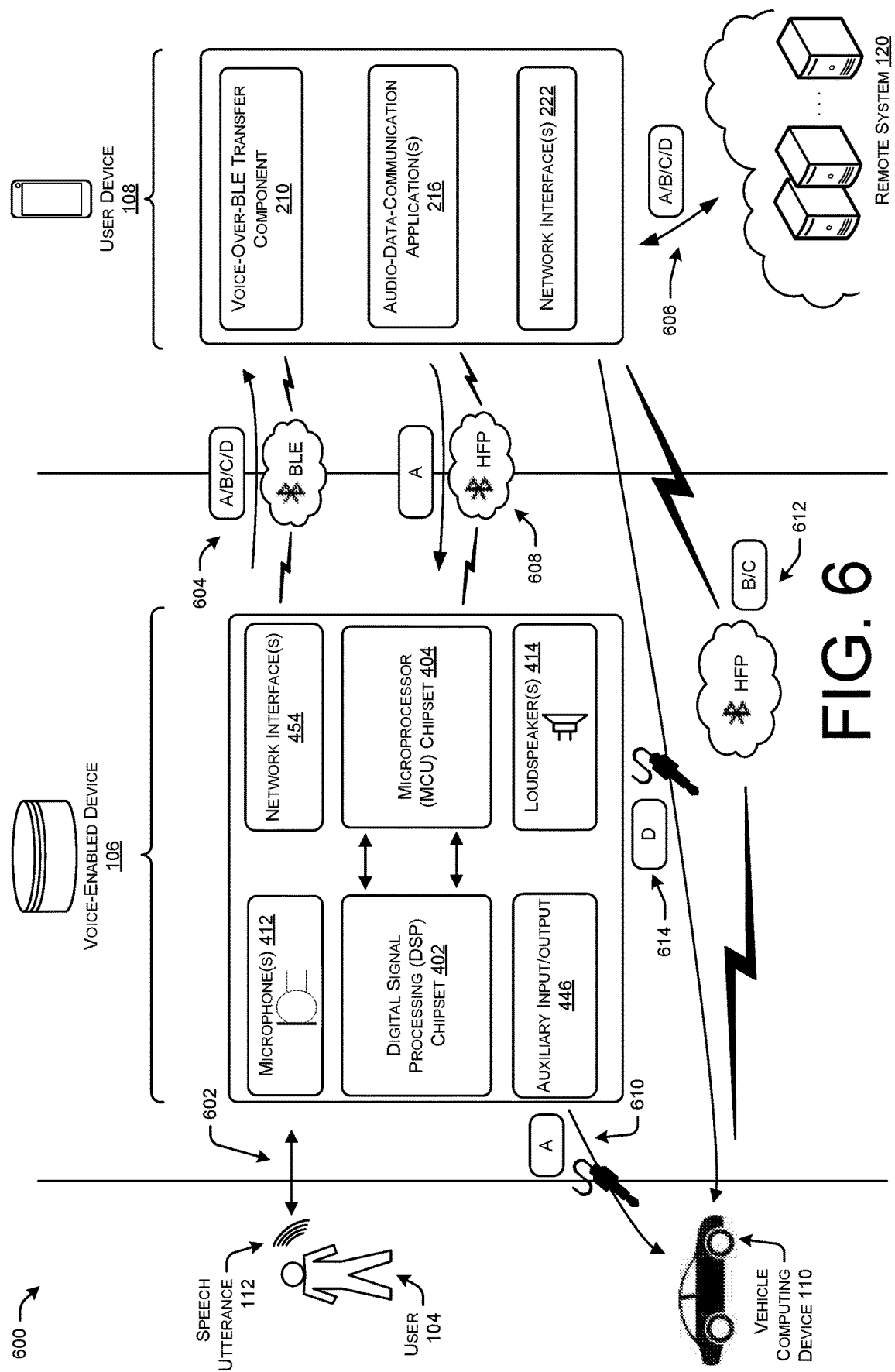

US 10,540,970 B2

ARCHITECTURES AND TOPOLOGIES FOR VEHICLE-BASED, VOICE-CONTROLLED DEVICES

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. Due to their usefulness, voice-enabled devices continue to proliferate. For instance, voice-enabled devices continue to be used in various environments, such as households, to help with everyday activities. However, as voice-enabled devices are introduced into new environments, difficulties often arise when attempting to interface these voice-enabled devices with existing device technology in the environments into which these voice-enabled devices are introduced.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates an example signal flow diagram where a voice-enabled device captures speech utterances of a user, and sends audio data representing the speech utterance to a user device to be transmitted to a remote speech-processing system. FIG. 5 further depicts an example where the user device and/or the voice-enabled device send additional audio data (e.g., music audio data) to a vehicle computing device.

FIG. 6 illustrates an example signal flow diagram where a voice-enabled device captures speech utterances of a user, and sends audio data representing the speech utterances to a user device to be transmitted to a remote speech-processing system. FIG. 6 further depicts an example where the user device and/or the voice-enabled device send call audio data to a vehicle computing device.

DETAILED DESCRIPTION

Figure 1A:
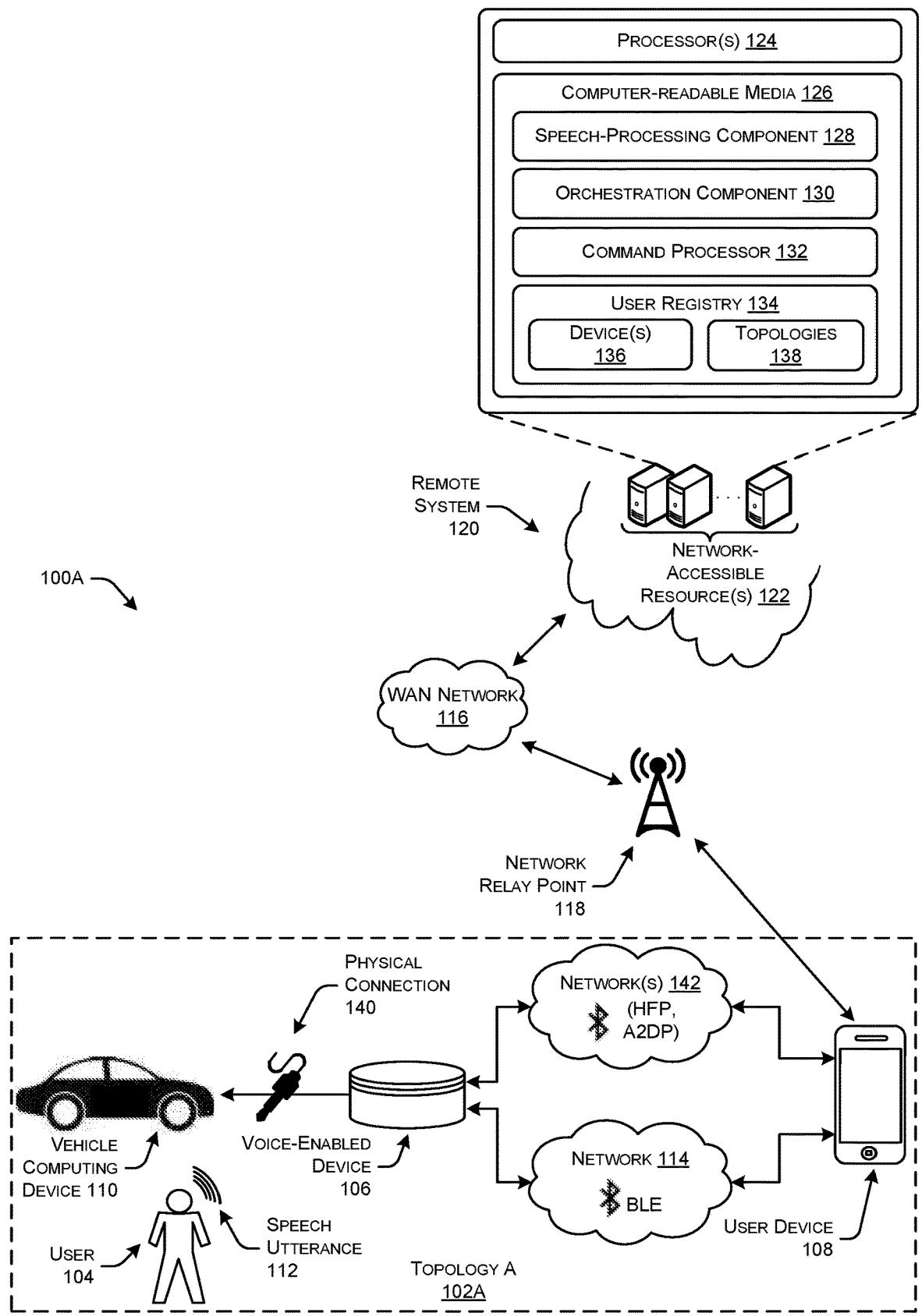
FIGS. 1A-1D illustrate schematic diagrams of illustrative topologies in which a voice-enabled device detects a speech utterance from a user, and communicates audio data between a user device and a vehicle computing device based partly on the speech utterance. In some examples, the speech utterance is transmitted to a remote speech-processing system, and the communication of the audio data between the devices in the illustrative topologies is based on an intent of the speech utterance determined by the remote speech-processing system.

With the proliferation of voice-enabled computing devices, or "voice-enabled devices," users are able to interact with more of their computing devices through speech. For instance, a user may issue a command via a speech utterance to a voice-enabled device to perform an operation, such as turning on/off an appliance, streaming music, performing a telephone call, etc. Due to the usefulness of these voice-enabled devices, it is desirable to have voice-enabled devices available for use different environments, particularly in environments in which users traditionally have been unable to interact with computing devices using speech. Voice-enabled devices continue to be implemented in certain environments, such as households, but various issues may arise as voice-enabled devices are introduced and integrated into new environments.

This disclosure describes, at least in part, techniques for implementing a voice-enabled device in vehicle environments to facilitate voice interaction with vehicle computing devices with differing communication capabilities. As the technology included in vehicles continues to evolve, the capabilities of vehicle computing devices (e.g., head unit computing devices) have increased. However, many vehicles include vehicle computing devices that are unable to perform various functionalities that users have become accustomed to in other environments, such as interacting with devices using voice commands. The techniques described herein include architectures of voice-enabled devices for vehicle environments, as well as communication topologies of devices which communicate in the vehicle environments, to enable vehicle computing device control using voice commands. For example, the voice-enabled devices may be configured to detect and capture speech utterances from a user in a vehicle environment, and ultimately result in a vehicle computing device performing actions that are responsive to commands included in the speech utterances issued by the user.

Due to the differing communication capabilities of vehicle computing devices, voice-enabled devices that are introduced into different vehicle environments must be capable of communicating using various protocols, standards, and/or profiles, in order to communicate with the vehicle computing devices. For example, certain vehicle computing devices may only be able to communicate using physical communication connections with other devices (e.g., auxiliary connections, Universal Serial Bus (USB) connections, etc.). In other examples, vehicle computing devices may be able to communicate using certain types of wireless communication protocols or profiles, (e.g., Bluetooth Hands Free Profile (HFP)), but not other types of wireless communication profiles (e.g., Bluetooth Advanced Audio Distribution Profile (A2DP)). In even further examples, more advanced vehicle computing devices may be able to communicate using various types of wireless protocols and/or profiles (e.g., Bluetooth HFP, Bluetooth A2DP, WiFi, etc.). Due to the differences in communication capabilities of vehicle computing devices, voice-enabled devices that are to be used in vehicle environments must be able to interact with various devices using different communication protocols and profiles, and coexist with other devices within the vehicle environments when arranged in different communication topologies.

In some examples, the voice-enabled devices may be relatively sophisticated in some respects. For example, the voice-enabled devices may include one or more microphones and hardware, software, and/or firmware components, to detect and capture speech utterances from a user. In some instances, the voice-enable devices may be configured to receive a "wake" trigger (e.g., wake word, button input, etc.) which indicates to the voice-enabled device that a user is issuing a command via a speech utterance. The voice-enabled device may proceed to capture, and stream, audio data representing the speech utterance to a network-based speech service. Thus, the voice-enabled devices described herein may be configured to detect and capture speech utterances from a user.

While the voice-enabled devices may perform some types of pre-processing on the audio data representing the speech utterances, often, the voice-enabled devices may be unsophisticated in other respects and have relatively low functionality. For instance, voice-enabled devices may comprise battery powered devices which are configured to merely serve as an interface or "middle man" between a user and a remote system or service (e.g., "cloud-based service," "software as a service (SaaS)," "network accessible platform," etc.). In this way, the more intensive processing involved in processing the speech utterances may be performed using large amounts of resources of remote systems, which may extend battery life performance of voice-enabled devices, and also reduce the amount of hardware and/or software included in the voice-enabled devices. For example, the voice-enabled devices may include one or more microphones and components to detect and capture a speech utterance of a user, and transmit audio data representing the speech utterance to a remote speech-processing system for further natural language processing to determine an intent of the speech utterance. In such examples, the voice-controlled devices may include network interfaces and functionality for communicating data over various networks, including personal area networks (PANs), wide area networks (WANs), local area networks (LANs), etc.

In some examples, the voice-enabled devices may be unable to communicate over certain types of networks, such as WANs, to further save battery power and/or reduce hardware and software requirements of the voice-enabled devices. However, the audio data that is generated by the voice-enabled devices that represents the speech utterance often must be sent to the remote speech-processing system using various networks, including WANs. In such examples, the communication topologies in the various vehicle environments may further include additional user devices (e.g., phones, tablets, etc.) which are configured to communicate data over WANs (e.g., 3G, 4G, 4G LTE, etc.). In this way, the various topologies may include the user devices to receive audio data from the voice-enabled devices, such as by a PAN and using short-range wireless communication protocols (e.g., Bluetooth, ZigBee, etc.), and transmit the audio data to the remote speech-processing system using WANs.

Generally, the topologies in which a voice-enabled device, a vehicle computing device, and a user device are arranged may depend on the communication capabilities of the vehicle computing device. In some examples, the vehicle computing device may be relatively simple in that the vehicle computing device is only capable of sending and receiving data using a physical communication connection (e.g., auxiliary, USB, etc.). In such examples, the voice-enabled device, vehicle computing device, and user device may be arranged in a particular topology, herein referred to as "Topology A." In Topology A, where the vehicle computing device is only able to send and receive data using a physical communication connection, the voice-enabled device may be communicatively coupled to the vehicle computing device using a physical connection, and communicatively coupled to the user device using one or more wireless connections. In this way, the voice-enabled device may detect and capture speech utterances, and send audio data representing the speech utterances to the user device using a wireless protocol (e.g., BLE). Upon receiving the audio data representing the speech utterance, the user device may transmit the audio data to the remote speech-processing system, which in turn processes the audio data. For instance, the remote speech-processing system may perform automatic speech recognition (ASR) techniques, and natural language understanding (NLU) techniques, on the audio data to determine an intent of the speech utterance (e.g., make a phone call, stream music, change the radio station, etc.). Further, the remote speech-processing system may determine a command that is responsive to the intent of the speech utterance (e.g., cause the user device to initiate a phone call, cause the user device to stream music data, etc.), and may also determine or provide additional audio data. For instance, the remote speech-processing system may provide additional audio data to be output by the voice-enabled device and/or the vehicle computing device. In some examples, the additional audio data may be responsive to the speech utterance, such as an auditory icon (hereinafter "earcon"), that is to be output on a loudspeaker of the voice-enabled device to indicate that the voice-enabled device captured the speech utterance and/or responded to the speech utterance. Further, the additional audio data may include a text-to-speech (TTS) engine which generates an actual audio file (e.g., TTS response) that is responsive to the speech utterance (e.g., "we have started the phone call," "we are streaming music," etc.), wherein the actual audio file is to be output by the vehicle computing device.

In Topology A, the user device may receive the command and/or the additional audio data (e.g., TTS response, earcon, etc.) from the remote speech-processing service, and determine one or more operations to perform. For example, the user device may include one or more applications configured to interpret the command, and determine various operations to perform. For instance, the speech utterance from the user may be "please play music," and the command may include an instruction to stream music from a web-based music service (e.g., Spotify, Pandora, Amazon Prime Music, etc.). Thus, the user device may receive and transmit the music audio data indicated in the command to the voice-enabled device using a wireless protocol (e.g., Bluetooth A2DP), which in turn sends the music audio data to the vehicle computing device using the physical connection to be output on loudspeakers of the vehicle. As another example, the speech utterance from the user may be "please call Fred," and the command received from the remote speech-processing service may be for the user device to identify a contact named Fred, and initiate a telephone call with that contact. The call audio data sent back and forth between the two user phone devices may be streamed through the voice-enabled device and over the physical connection to the vehicle computing device to be output on a loudspeaker of the vehicle. Generally, the vehicle computing device is coupled to one or more loud speakers in the vehicle which it uses to output audio corresponding to audio data. The vehicle computing device may include one or more loudspeakers in some examples, and/or be communicatively coupled to one or more loudspeakers in the vehicle.

Generally, the music audio data may correspond to any type of data which may be transmitted using a Bluetooth protocol, such as the Bluetooth A2DP. For instance, the music audio data may correspond to audio data transmitted and/or streamed over Bluetooth A2DP using various audio codecs used to compress and decompress digital audio data, such as subband codec (SBC), MPEG-1 Audio Layer 3 (MP3), MPEG-4 Part 14 (MP4), Advanced Audio Coding (AAC), aptX codec, or any other type of codec usable to stream audio data over the Bluetooth A2DP profile. Further, call audio data may correspond to any type of data which may be transmitted using a Bluetooth protocol, such as the Hands-Free profile (HFP). For example, the call audio data may correspond to audio data transmitted and/or streamed over Bluetooth HFP using various audio codecs used to compress and decompress digital audio data, such as mSBC codec, Continuously Variable Slope Delta Modulation (CVSDM), or any other type of codex usable to transmit call audio data over the Bluetooth HFP profile.

Further, in examples where the remote speech-processing service provides a TTS response and/or an earcon, the user device may send the TTS response and/or earcon to the voice-enabled device, which may output one or both of the TTS response and earcon, or alternatively send one or both of the TTS response and earcon to the vehicle computing device to be output on a loudspeaker of the vehicle.

In various examples, there may be multiple types of wireless connections between the voice-enabled device and the user device. For instance, audio data may be sent back and forth between the voice-enabled device and the user device using certain protocols or profiles (e.g., Bluetooth HFP for call audio data, Bluetooth A2DP for music audio data, etc.), whereas the audio data representing the speech utterances may be sent from the voice-enabled device to the user device using a different protocol or profile (e.g., BLE). In this way, certain types of audio data, such as call audio data and/or music audio data, may be transmitted between the voice-enabled device and the user device at a same time as a speech utterance is sent between the voice-enabled device and the user device. Thus, call audio data may be streamed between the various devices in Topology A, while audio data representing a speech utterance is also transmitted from the voice-enabled device and the user device.

Thus, in Topology A, audio data may be sent back and forth between the user device and the voice-enabled device using one or more wireless communication connections, and audio data may be sent from the voice-enabled device to the vehicle computing device using a physical connection.

In some examples, the vehicle computing device may be more sophisticated than a vehicle computing device described with respect to Topology A in that the vehicle computing device is able to wirelessly communicate using various communication protocols or profiles, including the Bluetooth A2DP for communicating music audio data, and HFP for communicating call audio data. In such examples, the devices interior the vehicle may be arranged in a different communication topology, hereinafter "Topology B," where the user device is wirelessly coupled to the vehicle computing device using the A2DP and/or HFP wireless communication connections, and the voice-enabled device is wirelessly coupled to the user device using the BLE connection. In Topology B, the voice-enabled device may detect speech utterances, such as by detecting a wake word, and transmit audio data representing the speech utterance to the user device, which in turn transmits the audio data to the remote speech-processing system. Further, the voice-enabled device may also be wirelessly coupled to the user device using the HFP wireless connection in order to transmit call audio data representing the telephone call that was generated by the microphone of the voice-enabled device. Thus, in some examples, the voice-enabled device may be transmitting or streaming call audio data to the user device using the HFP wireless connection, while also transmitting audio data representing a speech utterance of the user using the BLE wireless connection. In other examples, the user device may be streaming music audio data directly to the vehicle computing device using the A2DP wireless connection while the voice-enabled device detects and transmits a speech utterance of the user to the user device using the BLE wireless connection.

In Topology B, the user device may receive various data from the remote speech-processing service including commands determined based on the speech utterance, TTS response audio data for responding to the user's speech utterance, and/or earcon (e.g., auditory icon) audio data to indicate to the user that the speech utterance was detected and/or processed. In various examples, the user device may send the TTS response audio data and the earcon audio data to the vehicle computing device and/or the voice-enabled device to be output. For instance, the one or more applications executing on the user device may determine to send the earcon audio data to the voice-enabled device to be output by the loudspeaker of the voice-enabled device, and may transmit the TTS response audio data to the vehicle computing device to be output by a vehicle loudspeaker. Further, the applications executing on the user device may be configured to determine operations to perform based on the command received from the remote speech-processing service. For instance, the command received from the remote speech-processing service may be to perform a phone call with a contact of the user. In this example, the user device may call the contact's user device, and begin streaming call audio data directly to the vehicle computing device as it is received over the WAN from the contact's user device.

In various examples, other than those of Topologies A and B, the vehicle computing device may be configured to communicate using certain types of wireless connections, but not other types of wireless connections. For instance, the vehicle computing device may be able to stream call audio data using a wireless protocol (e.g., Bluetooth HFP), but unable to wirelessly communicate music audio data using another wireless protocol (e.g., Bluetooth A2DP). In such examples, a particular topology, hereinafter referred to as "Topology C," may be set up such that the user device may communicate with the vehicle computing device directly to send/receive, transmit, or stream call audio data using the Bluetooth HFP wireless connection. However, the user device may be connected to the voice-enabled device using the Bluetooth A2DP connection, and the voice-enabled device may in turn be connected to the vehicle computing device using a physical connection to send music audio data, and other types of data other than call audio data. Similar to Topologies A and B, the voice-enabled computing device and the user device in Topology C may be wirelessly connected using the BLE wireless connection to communicate audio data representing speech utterances, and further connected using the A2DP wireless connection such that the user device may stream audio data to the vehicle computing device through the voice-enabled device, such as music audio data, TTS response audio data, and/or earcon audio data.

In other examples, a user may decide to connect their user device to the vehicle directly using a physical communication connection. In such examples, a particular topology, hereinafter referred to as "Topology D," may be instantiated such that the user device may communicate with the vehicle computing device directly by sending audio data directly to the vehicle computing device using the physical connection. For instance, the user device may send call audio data, music audio data, TTS response audio data, and/or earcon audio data to the vehicle computing device using the physical connection. In Topology D, the voice-enabled computing device may be wirelessly coupled to the user device using one or more of (i) a BLE connection to send audio data representing speech utterances to the user device, (ii) an HFP connection to send/stream call audio data captured by the microphone of the voice-enabled device, and/or (iii) an A2DP connection to receive TTS response audio data and/or earcon audio data to be output by a loudspeaker of the voice-enabled computing device.

Thus, using the various Topologies A, B, C, and D, the voice-enabled device, in combination with the user device, may allow for a user of a vehicle to issue voice commands to control their vehicle computing device. Previously, many vehicle computing devices were unable to perform some or all of the techniques described herein using voice commands. Accordingly, the techniques described herein contemplate the use of a specialized, voice-enabled device that, when used in conjunction with a user device, improves the functioning of vehicle computing devices in various ways.

For instance, vehicle computing devices may be improved upon with the use of the voice-enabled device by facilitating the use of voice commands from a user to control audio being output from loudspeakers of the vehicle, and by facilitating music audio and/or call audio output using loudspeakers associated with the vehicle computing device. Even further, the voice-enabled device may improve upon the techniques previously performed in vehicle environments by enabling other types of voice commands, such as scheduling appointments, setting timers, ordering products from online marketplaces, and so forth. Additionally, by using the voice-enabled device in conjunction with the user device, a user is able to access various types of information from online sources that previously were not accessible (e.g., weather services, traffic services, navigation services, music streaming services, search function services, etc.).

In addition to providing technical improvements, the voice-enabled device may further provide various safety improvements over traditional computing devices. For instance, many jurisdictions have enacted laws which punish, or otherwise restrict, a driver's ability to interact with devices. As an example, users in certain jurisdictions may be subjected to legal punishment or other implications for using their hands to perform phone calls, or for using their phones for any other activity. However, using Topologies A, B, C, and D, users are able to use their vehicle computing devices, as well as their user devices (e.g., phones, tablets, etc.), while driving their car by issuing voice commands to their voice-enabled devices.

The techniques described herein are generally applicable to many different technologies and embodiments. For instance, while many of the techniques are described with respect to different Bluetooth protocols and/or standards, the described techniques are generally applicable to any type of wireless communication standard/protocol (e.g., WiFi, ZigBee, etc.), and also to any type of wired communication connection when appropriate. Further, while many of the techniques are described with respect to certain types of audio data (e.g., speech utterances, music audio data, call audio data, TTS response audio data, etc.), the techniques described herein are generally applicable to any type of data that may be communicated among devices.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1D illustrate schematic diagrams of illustrative topologies in which a voice-enabled device detects a speech utterance from a user, and communicates audio data between a user device and a vehicle computing device based partly on the speech utterance. In some examples, the speech utterance is transmitted to a remote speech-processing system, and the communication of the audio data between the devices in the illustrative topologies is based on an intent of the speech utterance determined by the remote speech-processing system.

FIG. 1A illustrates an example environment 100A depicting a communication Topology A 102A between computing devices in a vehicle environment. For instance, Topology A 102A illustrates a scenario where a user 104 utilizes a voice-controlled device 106, in combination with a user device 108, to control a vehicle computing device 110.

Generally, the voice-enabled device 106 and the user device 108 may be designed to operate from a fixed location, and in other embodiments, the voice-enabled device 106 and user device 108 may be portable or mobile. For instance, the voice-enabled device 106 and user device 108 may comprise handheld devices or other mobile devices, such as smartphones, tablet computers, media players, personal computers, wearable devices, various types of accessories, and so forth.

As shown in FIG. 1, the user 104 would like to control the vehicle computing device 110 by issuing a speech utterance including a command to the voice-controlled device 106. Accordingly, the user speaks a natural language speech utterance 112, such as "Play music from my playlist." The sound waves corresponding to the speech utterance 112 may be captured by one or more microphones of the voice-controlled device 106. In some implementations, the voice-controlled device 106 may process the captured signal. In other implementations, some or all of the processing of the sound may be performed by additional computing devices (e.g. servers) connected to the voice-controlled device 106 and/or user device 108 over one or more networks. For instance, in some cases the voice-controlled device 106 is configured to identify a predefined "wake word" (i.e., a predefined utterance). Upon identifying the wake word, the device 106 may begin uploading an audio signal generated by the device to remote servers for performing speech recognition thereon, as described in further detail below.

However, in some examples, the voice-enabled device may not be configured to transmit or send audio data representing the speech utterance 112 over certain types of networks. As an example, the voice-enabled device 106 may have certain capability limitations due to restraints in battery life, hardware components, software components, and so forth, which prevent the voice-enabled device 106 from sending audio data over certain networks, such as WANs. In such examples, the voice-enabled device 106 may be communicatively coupled to the user device 108 using one or more wireless connections so the user device 108 can communicate data, such as the audio data representing the speech utterance 112, over certain types of networks on behalf of the voice-enabled device 106. In some examples, the voice-enabled device 106 may be communicatively connected to the user device 108 using a wireless network (e.g., PAN, LAN, etc.), such as a Bluetooth Low Energy (BLE) network 114. Thus, the voice-enabled device 106 may be configured to detect the speech utterance 112 (e.g., wake word detection), generate audio data representing the speech utterance 112, and send the audio data over the BLE network 114 to the user device 108.

The user device 108 may comprise any type of computing device (e.g., telephone device, tablet device, laptop computing device, mobile device, etc.) configured to send and receive data. In some examples, the user device 108 may be configured to send and receive data over various types of networks, such as the BLE network 114 as well as a WAN network 116. For instance, the user device 108 may be configured to send and receive data over wireless wide area networks (WWANs), such as 3G networks, 4G networks, 4G LTE networks, and so forth. While illustrated as being a WAN network 116, the network 116 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the user device 108 may send data over the WAN network 116 using one or more network relay points 118 (e.g., cellular network towers) depending on the distance over which the data must travel. The WAN network 116 may represent an array of wired networks, wireless networks (e.g., WiFi), or combinations thereof.

As shown in FIG. 1, the user device 108 may couple with a remote system 120 over the WAN network 116. The remote system 120 may generally refer to a network-accessible platform—or "cloud-based service"—implemented as a computing infrastructure of processors, storage, software, data access, and so forth that is maintained and accessible via the WAN network 116, such as the Internet and/or a cellular network. Cloud-based services may not require end-user knowledge of the physical location and configuration of the system that delivers the services. Common expressions associated with cloud-based services, such as the remote system 120, include "on-demand computing", "software as a service (SaaS)", "platform computing", "network accessible platform", and so forth.

As illustrated, the remote system 120 may be implemented as one or more computing devices including one or more servers, desktop computers, laptop computers, or the like. In one example, the remote system 120 is configured in a server cluster, server farm, data center, mainframe, cloud computing environment, or a combination thereof. To illustrate, the remote system 120 may include any number of devices that operate as a distributed computing resource (e.g., cloud computing, hosted computing, etc.) that provides services, such as storage, computing, networking, and so on. Thus, the remote system 120 is generally implemented as network-accessible resources 122. These resources 122 comprise one or more processors 124 and computer-readable storage media 126 executable on the processors 124. The computer-readable media 126 may store various components, such as a speech-processing component 128, an orchestration component 130, a command processor 132, and a user registry 134. As noted above, upon the voice-enabled device 106 identifying the user 104 speaking the predefined wake word (in some instances) as part of the speech utterance 112, the voice-enabled device 106 may begin capturing audio from the environment 100A to generate audio data, or an audio signal, and send the audio data to the user device 108 which in turn begins uploading the audio data to the remote service 120 over the WAN network 116.

In response to receiving this audio signal, the speech-processing component 128 may begin performing speech-processing techniques on the audio data. For example, the orchestration component 130 of the remote system 120 may call an automated speech recognition (ASR) component of the speech-processing component 128 to process the audio data received from the user device 108 using automated speech recognition to generate text data representing the speech utterance from which one or more user voice commands may be identified. Further, the orchestration component 132 may call a natural language understanding (NLU) component of the speech-processing component 128 to process the text data representing the speech utterance using natural language understanding to determine an intent (e.g., intent data) expressed by the user 104 in the speech utterance 112. For example, if the user issued a command to "Please play music from my playlist," the NLU component may determine that the user's intent is to have music data streamed from a music streaming service (e.g., Pandora, Spotify, Amazon Prime Music, etc.).

Once the speech-processing component 128 has identified the intent of the speech utterance 112 of the user 104, the orchestration component 130 may provide an indication of the intent to the command processor 132. The command processor 132 may use the intent to determine a response for the processed speech utterance 112. For instance, the command processor 132 may work in conjunction with one or more speechlets that are configured to determine a response for the processed speech utterance 112, determine locations of relevant information for servicing a request from the user (e.g., network-based addresses at which the requested music audio data is stored), and/or generate and store the information if it is not already created, as well as route the identified intents to the appropriate destination command processor. The destination command processor may be determined based on the intent determined using the NLU. For example, if the NLU output includes a command to play music (play music intent), the destination command processor may be a music playing application, such as one located on the target voice-enabled device 106 and/or the user device 108, or in a music playing appliance, configured to execute a music playing command. The command processor may then cause the determined command to be sent to the user device 108 to cause the user device and/or the voice-enabled device 106 to perform the appropriate response for the command.

In some examples, the orchestration component 130 may further reference a user registry 134, which stores, for customers or users associated with the remote system 120, indications of one or more devices 136 associated with an account of the user 104, as well as topologies 138 indicating the communication connections between the devices of the user 104. In the example at hand, the devices 136 of the user 104 may include the voice-enabled device 106, the user device 108, and the vehicle computing device 110, and the topology 138 may indicate that the devices 136 are arranged in Topology A 102A, as described herein. Using the indications of the devices 136 and/or topologies, as well as the intent of the speech utterance 112, the command processor 132 may determine additional audio data to send to the user device 108. For instance, the command processor may determine auditory icon data, or earcon data, as well as TTS response audio data (e.g., an actual audio file containing one or more machine-generated words responsive to the intent of the speech utterance 112). The command processor 132 may further send the additional audio data (e.g., earcon audio data, TTS response audio data, etc.) to the user device 108 along with the command determined for the speech utterance 112. Upon receiving the command and/or additional audio data, one or more applications executing on the user device 108 may determine various operations to perform.

Generally, regardless of the different topologies described in FIGS. 1A-1D, the techniques described thus far with respect to FIG. 1A are applicable for each of the topologies. For instance, the voice-enabled device 106 is coupled to the user device 108 using the BLE network 114 connection to send audio data representing speech utterances 112. Similarly, the user device 108 sends the audio data to the remote system 120 for each topology, and receives the commands determined as being responsive to intents of the speech utterance 112, and/or the additional audio data. However, the flow of audio data from the user device 108 and to the voice-enabled device 106 and/or the vehicle computing device 110 may differ from this point depending on the topologies of FIGS. 1A-1D.

Generally, when the voice-enabled device 106 is introduced into the environment 100A of the vehicle, an initialization process must be performed to communicatively couple the voice-enabled device, the user device 108, and the vehicle computing device 110 to each other. In some examples, the voice-enabled computing device 106 may require an initial setup process that is performed using the user device 108. For example, the user device 108 may download and install one or more applications which help manage the devices in Topology A 102A, manage the flow of audio data between the devices, and perform the initialization process. In some examples, the applications executing on the user device 108 may prepare the voice-enabled device 106 for use in the Topology A 102A by performing an out-of-box experience (OOBE) with the user 104. For example, the applications may prompt the user 104, using one or more user interfaces presented on a display and/or auditory prompts from loudspeakers of the user device 108 and/or voice-enabled device 106, to provide indications of how the devices in Topology A 102A are coupled to each other. As an example, the applications executing on the user device 108 may ask the user whether the vehicle computing device 110 is capable of communicating using a wireless connection, whether the user device 108 is connected to the vehicle computing device 110 via a physical connection, and other questions to help determine how the devices in Topology A 102A are to be connected.

The communication topologies of the devices 106, 108, and 110 may be dependent on the communication capabilities of the vehicle computing device. In Topology A 102A, the user 104 may indicate to the user device 108 using the applications that the vehicle computing device 110 is only capable of communicating using a physical connection 140 (e.g., auxiliary connection, USB connection, etc.). In light of this, the applications executing on the user device 108 may instruct the user 104 to connect the voice-enabled device 106 to the vehicle computing device 110 using the physical connection 140, and store an indication that the voice-enabled device 106 is coupled to the vehicle computing device 110 using the physical connection 140. The user device 108 may stream various types of data (e.g., call audio data, music audio data, TSS response audio data, etc.) to the voice-enabled device 106, which in turn sends the audio data to the vehicle computing device 110. In this way, the audio data may be output by loudspeakers of the vehicle computing device 110, which may have better sound quality than loudspeakers of the voice-enabled device 106 and the user device 108.

Due to the different types of audio data that is to be streamed from the user device 108 through the voice-enabled device 106, and ultimately to the vehicle computing device 110, the voice-enabled device 106 may be communicatively coupled to the user device 108 using wireless connections in addition to the BLE network 114. For instance, the voice-enabled device 106 may be coupled to the user device 108 using additional Bluetooth standards or protocols, such as the Bluetooth Advanced Audio Distribution Profile (A2DP) for communicating/streaming various audio data (e.g., music audio data), and/or the Bluetooth Hands-Free Profile (HFP). Thus, the voice-enabled device 106 may be communicatively coupled to the user device 108 using an A2DP network and/or an HFP network 142. In this way, the user device 108 may receive call audio data via the WAN network 116, and stream the call audio data over the HFP network 142 to the voice-enabled device 106, which in turn sends the call audio data to the vehicle computing device 110 to be output on loudspeakers of the vehicle associated with the vehicle computing device 110. Additionally, the voice-enabled device 106 may capture speech utterances 112 from the user 104 that is part of a streaming voice call, and send call audio data back over the HFP network 142 to the user device 108 for transmission across the WAN network to the other user device performing the phone call. Similarly, the user device 108 may stream music audio data from a music source, such as a network-based music service, and send the music audio data over the A2DP network 142 to the voice-enabled device 106, which in turn sends the music audio data over the physical connection 140 to the vehicle computing device 110 to be output on the loudspeakers of the vehicle.

In some examples, additional audio data may be sent over the networks 142. For instance, the TTS response audio data and/or the earcon audio data may be sent over the A2DP network 142 from the user device 108 to the voice-enabled device 106. Depending on the configuration of the voice-enabled device 106 and vehicle computing device 110, and/or preferences of the user 104, one or both of the TTS response audio data and the earcon audio data may be output on loudspeakers of the voice-enabled device 106. Alternatively, one or both of the TTS response audio data and the earcon audio data may be send over the physical connection 140 to the vehicle computing device 110 to be output on loudspeakers associated with the vehicle computing device 110.

Thus, according to the Topology A 102A shown in FIG. 1A, audio data may be communicated between the voice-enabled device 106, the user device, 108, and/or the vehicle computing device 110 depending on the types of audio data. For instance, the user 104 may issue a speech utterance 112 of "Please play music from my favorite artist." In this example, the voice-enabled device 106 may detect the speech utterance 112 and generate audio data representing the speech utterance. The audio data may be sent from the voice-enabled device 106 to the user device 108 over the BLE network 114, and the user device 108 may transmit the audio data to the remote system 120 using the WAN network 116. The remote system 120 may determine that the intent of the speech utterance 112 is to "play music," and further determine a location at which the music audio data is stored (e.g., network-based location, Universal Resource Locator (URL), Universal Resource Identifier (URI), store location local to the user device 108, etc.). Further, the remote system 120 may generate and/or determine additional audio data such as TTS response audio data and/or earcon audio data, and transmit the command along with the additional audio to the user device 108. The user device 108 may perform various operations, such as obtaining or accessing the music audio data from the storage location and begin streaming the music audio data over the A2DP network 142 to the voice-enabled device 106. The voice-enabled device 106 in turn sends the music audio data to the vehicle computing device 110 using the physical connection 140 for the music audio data to be output by a loudspeaker of the vehicle computing device 110. Further, the user device 108 may send the TTS response audio data and the earcon audio data to the voice-enabled device 106. Depending on the configuration of the voice-enabled device 106 and/or the vehicle computing device 110, the voice-enabled device 106 may output one or both of the TTS response audio data and the earcon audio data, or send one or both of the TTS response audio data and the earcon audio data to the vehicle computing device 110 to be output by the vehicle loudspeakers. In some examples, the earcon audio data may represent sounds that are responsive to speech utterances, and similarly, the TTS response audio data may represent one or more machine-generated words that are responsive to the speech utterance (e.g., "We are playing your music.").

As another example, the user 104 may issue a speech utterance 112 of "Please call Fred." In this example, the voice-enabled device 106 may detect the speech utterance 112 and generate audio data representing the speech utterance 112. The audio data may be sent from the voice-enabled device 106 to the user device 108 over the BLE network 114, and the user device 108 may transmit the audio data to the remote system 120 using the WAN network 116. The remote system 120 may determine that the intent of the speech utterance 112 is to "perform a phone call," and further determine that the contact to be called is stored in the contacts of the user device 108. The remote system 120 may send a command to the user device 108 using the WAN network 116 indicating that the user device 108 is to call the contact "Fred," and the user device 108 may begin streaming call audio data over the HFP network 142 to the voice-enabled device 106, which in turn sends the voice call audio data to the vehicle computing device 110 to be output by loudspeakers of the vehicle.

Other types of operations may be performed by the various devices in Topology A 102A. For instance, the user 104 may issue a command in the speech utterance 112 requesting relatively simple responses from the remote system, such as "What time is it?" or "Please schedule an appointment for this day." The remote system 120 may determine commands responsive to the speech utterance 112, such as "The current time is 2:00 PM," or "We have schedule your appointment," and send back various commands and the TTS response audio data to the user device 108. The user device 108 may perform various operations, such as scheduling the desired appointment using a calendar of the user 104, and also sending the TTS response audio data over the A2DP network 142 to the voice-enabled device 106, which in turn sends the TTS response audio data to the vehicle computing device 110 using the physical connection 140.

In some examples the voice-enabled device 106, user device 108, and/or the vehicle computing device 110 may communicate data simultaneously using the various communications connections/networks in Topology A 102A. For example, the user device 108 may be streaming call audio data over the WAN network 116 with another user device. The call audio data may be sent over the HFP network 142 to the voice-enabled device 106, which in turn sends incoming call audio data to the vehicle computing device 110. Further, the voice-enabled device may capture speech utterances 112 of the user 104 as part of the telephone call, and send call audio data representing these speech utterances 112 over the HFP network 142 to the user device 108 to be transmitted over the WAN network 116. While this call audio data is streaming, the user 104 may issue a speech utterance 112 that was preceded by a predefined wake word. The voice-enabled device 106 may detect this wake word and capture subsequent sound from the user 112.

In such examples, the voice-enabled device 106 may generate audio data representing the speech utterance 112 that was captured subsequent the wake word and transmit the audio data over the BLE network 114. Simultaneously, the voice-enabled device 106 may send the wake word and subsequent speech utterance 112 over the HFP network 142 to the user device 108. In this example, the contact of the user 104 that is having the telephone call with the user 104 may hear the speech utterance including the wake word. The user device 108 may not only send the call audio data that includes the wake word and subsequent utterance 112 to the contact's user device, but may further relay the audio data representing the command and received over the BLE network 114 to the remote system 120 for processing. As an example, the user 104 may issue a command of "Please schedule lunch with Fred for next Tuesday," as the user 104 is having a telephone conversation with their contact named Fred. The remote system 120 may return an instruction to the user device 108 to schedule the appointment on the user's 104 calendar for the requested date, and further send back TTS audio response data which includes machine-generated words responsive to the speech command, such as "We have scheduled your lunch appointment with Fred." The user device 108 may continue to stream the call audio data, and may further send the TTS audio response data to the voice-enabled device 106 using the A2DP network 142 while streaming the call audio data with the voice-enabled device 106 using the HFP network 142. The voice-enabled device 106 may then communicate the TTS response audio data to the vehicle computing device 110, and continue to communicate incoming call audio data to the vehicle computing device 110.

Upon receiving the TTS response audio data, the vehicle computing device 110 may output the machine-generated words represented by the TTS response audio data on loudspeakers of the vehicle. In some examples, the vehicle computing device 110 may simultaneously be outputting sound represented by call audio data received from the contact's user device. In such examples, the vehicle computing device 110 may be configured to mute, or attenuate (e.g., lower volume) the call audio data while the TTS response audio data is output by the vehicle computing device loudspeakers. Further, the voice-enabled device 106 may be configured with components for performing echo cancellation. Using these echo cancellation components, the voice-enabled device 106 may cancel, or filter out, the sound corresponding to the TTS response audio data to prevent call audio data sent to the contact's user device from including the sound corresponding to the TTS response audio data. The techniques described above with respect to simultaneously communicating and outputting call audio data along with TTS response audio data may similarly be applied to situations where, instead of call audio data, music audio data (or other audio data) is being streamed. For instance, the techniques may similarly apply when music audio data is streamed from the user device 108 to the voice-enabled device 106 using the A2DP network 142, and sent to the vehicle computing device 110 to be output by the vehicle computing device 110 while speech utterances 112 are detected after a wake word are communicated, and TTS response audio data is communicated to be output by the vehicle computing device 110.

Figure 1B:
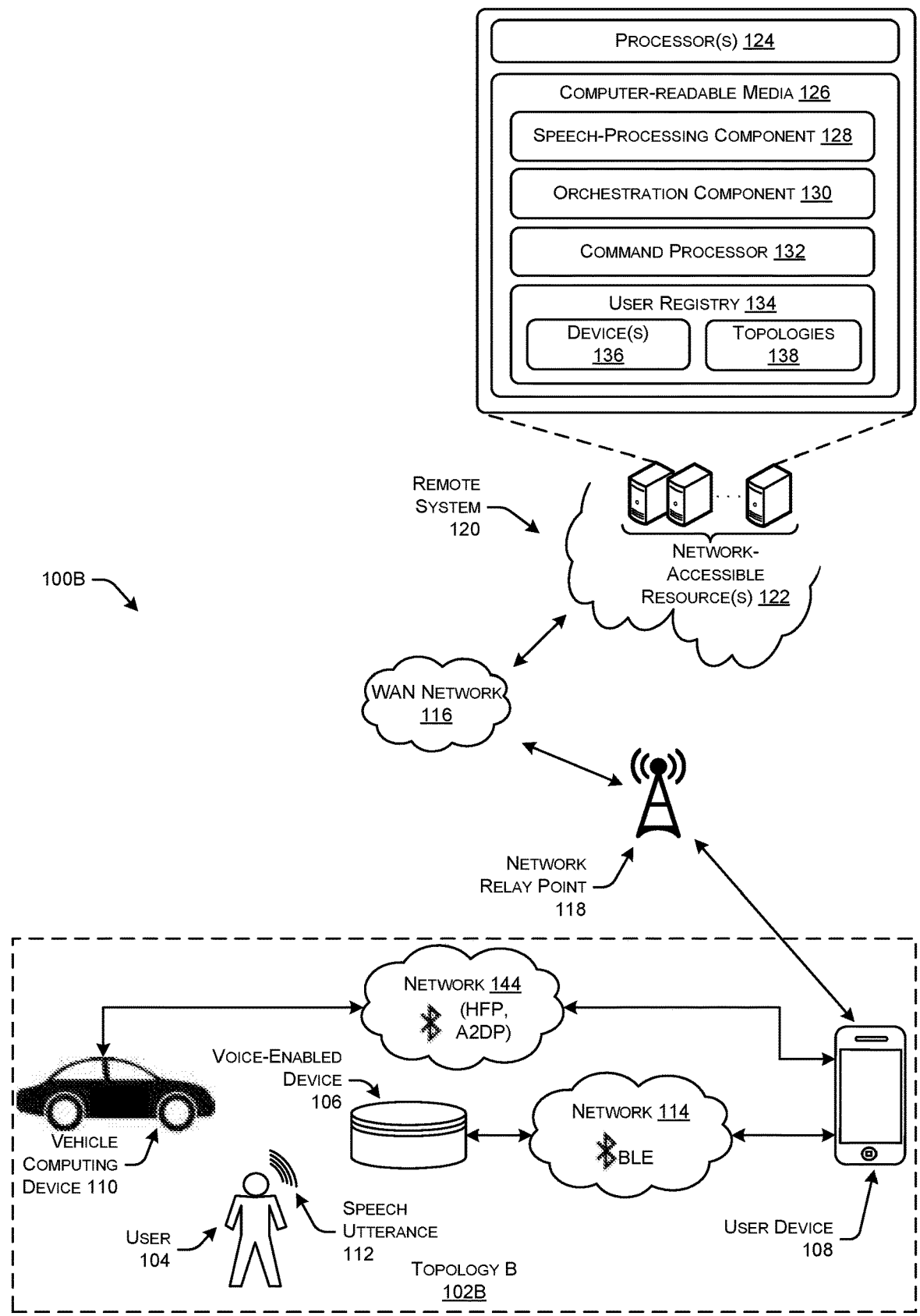

FIG. 1B illustrates a schematic diagram of another illustrative topology in which a voice-enabled device 106 detects a speech utterance 112 from a user 104, and communicates audio data between the voice-enabled device and a user device using a BLE network 114. Insofar as the various components of FIG. 1B are numbered the same as those of FIG. 1A, the operations performed by the components and devices are substantially similar.

In FIG. 1B, the environment 100B illustrated depicts a communication Topology B 102B. In some examples, the vehicle computing device 110 shown in Topology B 102B may be more sophisticated than that described with respect to Topology A in that the vehicle computing device 110 in Topology B 102B is able to wireless communicate using various communication protocols or profiles, including the Bluetooth A2DP for communication music audio data, and Bluetooth HFP for communicating call audio data. In such examples, the devices interior the vehicle may be arranged in a different communication topology, such as Topology B 102B, where the user device 108 is wirelessly coupled to the vehicle computing device 110 using A2DP and HFP network(s) 144, and the voice-enabled device 106 is wirelessly coupled to the user device 108 using the BLE network 114. In Topology B 102B, the voice-enabled device 106 may similarly detect speech utterances 112, such as by detecting a wake word, and transmit audio data representing the speech utterance 112 to the user device 108, which in turn transmits the audio data to the remote system 120 for speech processing. Further, the voice-enabled device 106 may also be wirelessly coupled to the user device 108 using an HFP network 144 connection in order to transmit call audio data representing a telephone call that is generated by the microphone of the voice-enabled device 106. Thus, in some examples, the voice-enabled device 106 may be transmitting or streaming call audio data to the user device 108 using an HFP network 144, while also transmitting audio data representing a speech utterance 112 of the user 104 using the BLE network 114 connection.

Unlike Topology A 102A, the vehicle computing device 110 in Topology B 102B is configured to communicate with devices using various wireless networks or connections, such as HFP and A2DP networks 144. Accordingly, the user device 108 may send music audio data, call audio data, TTS response audio data, and/or other types of data directly to the vehicle computing device 110 using the HFP and/or A2DP networks 144 established between the user device 108 and the vehicle computing device 110. Thus, there is no requirement for a physical connection 140 in Topology B 102B, as opposed to Topology A 102A. In a telephone call example, the voice-enabled device 106 may detect speech utterances 112 of the user 104 that is engaged in the telephone call performed by the user device 108, and send call audio data across an HFP network 144 between the voice-enabled device 106 and the user device 108 (not shown), or alternatively, send the audio data across the BLE network 114. The user device 108 may then transmit the call audio data across the WAN network 116 to the appropriate contact user device, and also receive call audio data from the contact user device. The user device 108 may then stream or otherwise send the call audio data across the HFP network 144 directly to the vehicle computing device 110, which in turn outputs the call audio data using loudspeakers of the vehicle. Thus, in Topology B 102B, the capabilities of the vehicle computing device 110 allow for direct, wireless communication with the user device 108 and/or the voice-enabled device 106, rather than using a physical connection 140.

Figure 1C:
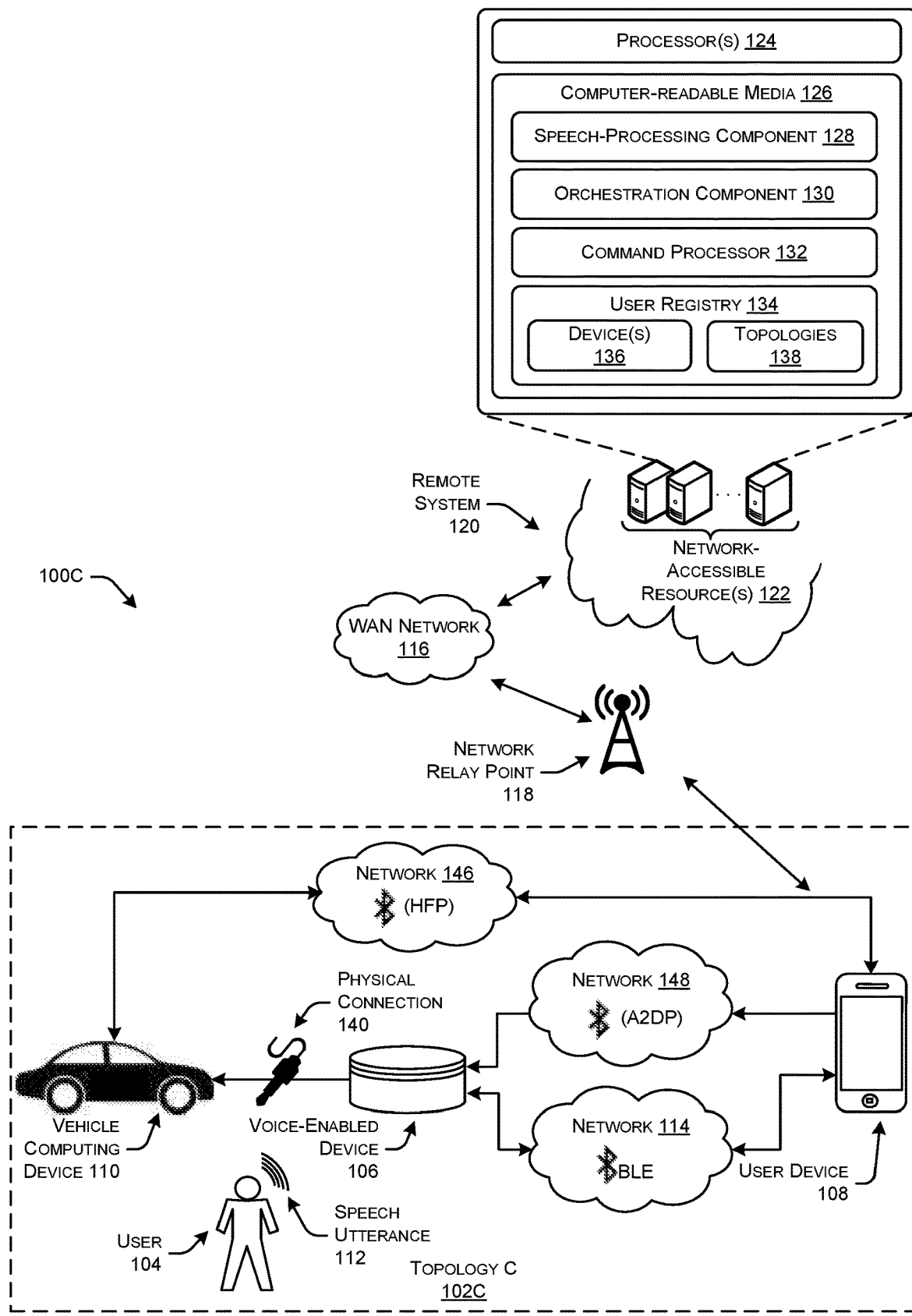

FIG. 1C illustrates a schematic diagram of another illustrative topology in which a voice-enabled device 106 detects a speech utterance 112 from a user 104, and communicates audio data between the voice-enabled device 106 and a user device 108 using a BLE network 114. Insofar as the various components of FIG. 1C are numbered the same as those of FIG. 1A, the operations performed by the components and devices are substantially similar.

In FIG. 1C, the environment 100C illustrated depicts a communication Topology C 102C between devices associated with a vehicle. In some examples, the vehicle computing device 110 shown in Topology C 102C is more sophisticated than that of Topology A 102A, but may be less sophisticated than that of Topology B 102B. For example, the vehicle computing device 110 may be able to stream call audio data using a wireless network, such as HFP network 146, but unable to wirelessly communicate music audio data using another wireless protocol, such as Bluetooth A2DP. In such examples, Topology C 102C may be set up such that the user device 108 may communicate with the vehicle computing device 110 directly to send/receive, transmit, or stream call audio data using the Bluetooth HFP network 146. However, the user device 108 may be connected to the voice-enabled device 106 using a Bluetooth A2DP network 148, and the voice-enabled device 106 may in turn be connected to the vehicle computing device 110 using a physical connection 140 to send music audio data, and other types of data other than call audio data. Similar to Topologies A and B, the voice-enabled device 106 and the user device 108 in Topology C 102C may be wirelessly connected using the BLE network 114 to communicate audio data representing speech utterances 112, and further connected using the A2DP network 148 such that the user device 108 may stream audio data to the vehicle computing device 110 through the voice-enabled device 106, such as music audio data, TTS response audio data, and/or earcon audio data, where the voice-enabled device 106 relays the audio data to the vehicle computing device 110 using the physical connection 140.

Figure 1D:
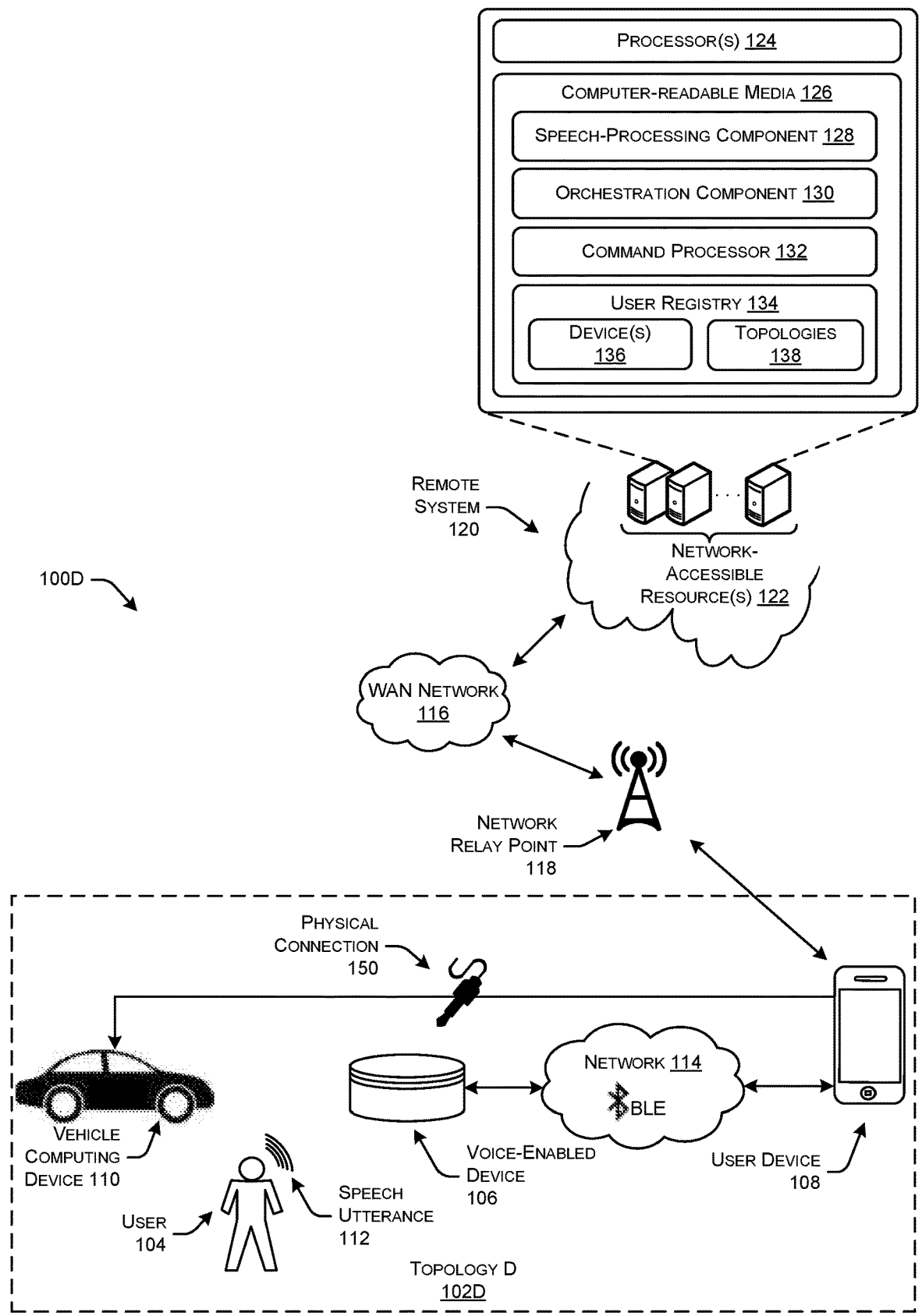

FIG. 1D illustrates a schematic diagram of another illustrative topology in which a voice-enabled device 106 detects a speech utterance 112 from a user 104, and communicates audio data between the voice-enabled device 106 and a user device 108 using a BLE network 114. Insofar as the various components of FIG. 1D are numbered the same as those of FIG. 1A, the operations performed by the components and devices are substantially similar.

In FIG. 1D, the environment 100D illustrated depicts a communication Topology D 102D. In some examples, the user device 108 may determine, such as through an out-of-box experience (OOBE) performed with the user 104, that the user device 108 is connected through a physical connection 150 (e.g., auxiliary, USB, etc.) to the vehicle computing device 110. In such examples, the user device 108 may simply send audio data, such as music audio data, call audio data, TTS response audio data, etc., to the vehicle computing device 110 through the physical connection 150. Similar to Topologies A, B, and C, the user device 108 in Topology D 102D may be wirelessly connected to the voice-enabled device 106 using the BLE network 114. In some examples, the voice-enabled device 106 may send speech utterances 112 to the user device 108 using the BLE network 114, and may in other examples, send call audio data captured by the microphones of the voice-enabled device 106 to the user device 108 using an HFP network (not shown).

Generally, the user device 108 may facilitate sending, receiving, transmitting, streaming, or any other type of communication of data between devices or locations outside of the vehicle interior illustrated in Topologies A, B, C, and D. For instance, the user device 108 is in charge of communicating with the remote system 120 to determine intents or commands that are responsive to the speech utterances 112, and further receive TTS response audio data and/or earcon audio data to be output by the vehicle computing device 110, and/or the voice-enabled device 106. Further, the user device 108 may include applications which enabled it to perform calls with other devices, such as other voice-enabled devices which use or are associated with the speech-processing system/services provided by the remote system 120. Further, the user device 108 may obtain, access, or receive audio data based on commands issued from the remote system 120. For instance, the user device 108 may receive indications of various addresses or locations at which music audio data is stored that the user 104 requested to be played using a speech utterance 112. The user device 108 may access network-based music streaming services (Pandora, Spotify, Amazon Prime Music, etc.) and send or stream music audio data over the WAN network 116 in order to be output by the vehicle computing device 110 loudspeakers, or may simply send music audio data to the vehicle computing device 110 that is stored locally at the user device 110.

With respect to earcon audio data, in some examples, various earcon audio data may be stored locally at the voice-enabled device 106 to be output by loudspeakers of the voice-enabled device 106 responsive to different speech utterances 112. For instance, earcon audio data may be output upon detecting a speech utterance 112, or may be output upon receiving, from the user device 108, indications of commands that were included in the speech utterances 112 (e.g., "play next song", "call my brother," etc.). The earcon audio data may further be output during stages of an OOBE process, or at any other time when a user 104 is interacting with the voice-enabled device 106. In some examples, the earcon audio data may be output by loudspeakers of the voice-enabled device 106, and in other examples, the earcon audio data may be output by the vehicle computing device 110 and/or the user device 108. Similarly, TTS response audio data may be output by the user device 108 loudspeakers, voice-enabled device 106 loudspeakers, and/or vehicle computing device 110 loudspeakers depending on the configuration of the devices. However, depending on the quality of the loudspeakers in the various devices, it may be advantageous to output audio data using loudspeakers of the vehicle computing device 110.

As described above, the voice-enabled devices 108 may receive or capture sound corresponding to the speech utterance 112 of the user via one or more microphones. In certain implementations, the speech utterance 112 may include or be preceded by a wakeword or other trigger expression or event that is spoken by the user 104 to indicate that subsequent user speech is intended to be received and acted upon by the voice-enabled devices 108 and/or remote system 120. The voice-enabled devices 108 may detect the wakeword and begin streaming audio signals to the remote system 120. In some instances, the voice-enabled devices 108 may operate in a low-functionality mode and analyze sound using ASR processing. When the wakeword is detected using ASR, the voice-enabled devices 108 may begin streaming the audio signal, and other data, to the user device 108, which in turn streams the audio signal/data to the remote system 120. The wakeword may be a reserved keyword that is detected locally by the voice-enabled device6 106, such as by using an expression detector that analyzed audio signals/data produced by the microphones of the voice-enabled device 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether the predefined word or expression was represented in the audio signal/data.

In certain embodiments, an expression detector of the voice-enabled device 106 may be configured to analyze the audio data to produce a score indicating a likelihood that the wakeword is represented in the audio data. The expression detector then compares the score to a threshold to determine whether the wakeword will be declared as having been spoken. For instance, the ASR techniques may involve using a Hidden Markov Model (HMM) recognizer that performs acoustic modeling of the audio signal and compares the HMM model of the audio signal to one or more reference HMM models that have been created by training for a specific trigger expression.

As briefly noted above, the speech-processing component 128 may include an automatic speech recognition (ASR) component, and a natural language understanding (NLU) component for processing audio data representing speech utterances 112. The orchestration component 130 may stream the audio data to the ASR component, which detects the speech utterance 112 and sends a message to the user device 108, and in turn the voice-enabled device 106 to close the stream of the audio data. In some instances, the ASR component of the speech-processing component 128 may process the audio data at to determine textual data which corresponds to the speech utterance 112. In some examples, the ASR component may generate ASR confidence scores representing the likelihood that a particular set of words of the textual data matches those spoken in the speech utterance 112. For instance, the ASR component may determine a confidence or likelihood that a particular word which matches the sounds would be included in the sentence at the specified location (e.g., using a language or grammar model). Thus, each potential textual interpretation of the spoken utterance 112 (hypothesis) is associated with an ASR confidence score.

In various examples, the textual data corresponding to the speech utterance 112 may be sent from the orchestration component 130 to the NLU component to be analyzed or processed by the NLU component to determine an intent expressed by the user 104 in the speech utterance 112. For example, if the user 104 issued a command to "please schedule an appointment," the NLU component may determine that the user's intent is to have the user device 108 and/or the voice-enabled device 106 schedule an appointment for the user 104. Once the intent has been determined by the NLU component, the orchestration component 130 may pass the intent to the command processor 132, which generates the commands for the user device 108 and/or the voice-enabled device 106. The commands may include instructions to perform a task or operation responsive to the speech utterance 112, TTS response audio data, earcon audio data, and so forth. Further description of the remote system may be found in FIGS. 7A and 7B.

In each of FIGS. 1A-1D, the voice-enabled device 106 may be controlled or otherwise instructed to perform operations via control messages sent from the user device 108 depending based on the intent and command determined by the remote system 120. The control messages may be sent using any connection between the two devices 106 and 108, such as the BLE network 114. As an example, in Topology 102A and/or 102C, the voice-enabled device 106 may receive a control message from the user device 108 which instructs the voice-enabled device 106 to stream music audio data from the user device 108 using the A2DP networks 142 and 148, and in turn send that music audio data to the vehicle computing device 110. In some examples, the control message(s) may further cause the voice-enabled device 106 to perform other operations, such as outputting earcon audio data and/or TTS response data using a loudspeaker of the voice-enabled device 106, and/or output different patterns and/or colors of lights using one or more light sources (e.g., light emitting diodes) of the voice-enabled device 106. In this way, the user device 108 may instruct, or notify, the voice-enabled device 106 as to operations it should perform based on the command or instructions received from the remote system 120 (e.g., command to conduct a phone call, command to stream music, etc.).

Figure 2:
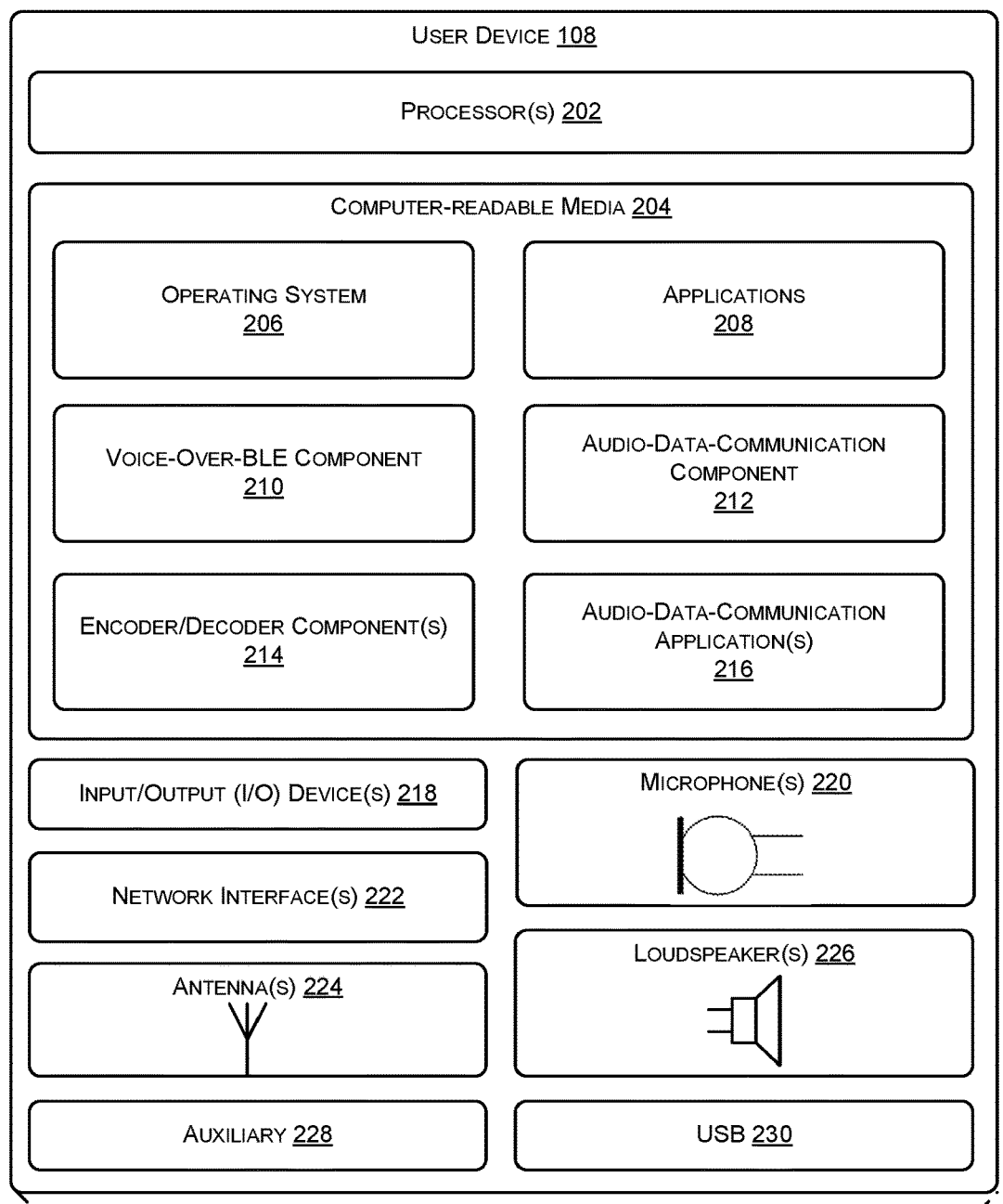
FIG. 2 illustrates a block diagram of an example architecture of a user device which communicates data over networks, such as wide area networks (WANs), on behalf of a voice-enabled device.

FIG. 2 illustrates a block diagram of an example architecture of a user device 108 which communicates data over networks, such as wide area networks (WANs), on behalf of a voice-enabled device 106. In some examples, the user device 108 may comprise a fixed device in an interior of a vehicle, or a mobile device carried with the user 104. For instance, the user device 108 may be fixed to, or part of, a vehicle head unit. The user device 108 may also be associated with, or a part of, the vehicle computing device 110. In some examples, the user device 108 may comprise a mobile device, such as a phone, table laptop computer, netbook, or other computing device.

In the illustrated implementation, the user device 108 includes one or more processors 202 and computer-readable media 204. The one or more processors 202 may process data and power the various hardware, software, and firmware components of the user device 108. The computer-readable media 204 may store various components, including an operating system 206 that is configured to manage hardware and services within and coupled to the user device 108 for the benefit of other modules. In addition, the computer-readable media 204 may store one or more applications 208 that a user 104 may interact with by issuing voice commands to the voice-enabled device 106, such as a music player, a movie player, a timer, a calendar, and a personal shopper. However, the user device 108 may include any number or type of applications and is not limited to the specific examples shown here. The music player may be configured to play songs or other audio files. The movie player may be configured to play movies or other audio visual media. The timer may be configured to provide the functions of a simple timing device and clock. The personal shopper may be configured to assist a user 104 in purchasing items from web-based merchants.

As described above, the user device 108 may be configured to communicate with the voice-enabled device 106 over a BLE network 114. For instance, the user device 108 may receive various audio data, such as audio data representing speech utterances 112 detected by the speech-enabled device, earcon data, etc. To facilitate communication of voice commands over a BLE network 114, the user device 108 may include a voice-over-BLE (VoBLE) component 210. The VoBLE component 210 may include logic, such as protocols, to facilitate communication of audio data representing speech utterances 112, and/or other data, over a BLE network 114.

The computer-readable media 204 may further include an audio-data-communication component 212. The audio-data-communication component 212 may be enable communication of audio data over various networks by the user device 108. For instance, the audio-data-communication component 212 may include logic, such as protocols, for communication over any type of network (e.g., PANs, WANs, LANs, etc.), and using various protocols or standards (Bluetooth, WiFi, ZigBee, etc.). To further enable the user device 108 to communicate using various types of protocols or standards, the user device 108 may further include one or more encoder/decoder components 214. While illustrated as a single component, the encoder/decoder components 214 may comprise a single, or multiple, independent components depending on the types of encoding and decoding being performed. In some examples, the encoder/decoder components 214 may encode and/or decode various data, such as audio data, upon transmission or upon reception of the data. For instance, the encoder/decoder components 214 may be configured to encode and decode data using low-complexity subband codec (SBC) to facilitate communication of data for the Bluetooth A2DP. In such examples, the encoder/decoder components 214 may include digital audio encoders to transfer audio data to the voice enabled device 106, and/or the vehicle computing device 110. Further, the encoder/decoder components 214 may be configured to encode and/or decode data using an mSBC codec for various types of data, such as call audio data communicated using the Bluetooth HFP.

The computer-readable media 204 of the user device 108 may further include one or more audio-data-communication application(s) 216. Generally, the audio-data-communication application(s) 216 may be configured to perform various types of communications according to a topology of the devices in the vehicle environment. For instance, as discussed with respect to FIGS. 1A-1D, the audio-data-communication application(s) 216 may be configured to determine which topology the voice-enabled device 106, user device 108, and vehicle computing device 110 are arranged in. In some examples, the audio-data-communication application(s) 216 may prompt the user 104, using auditory and/or visual prompts, for input to determine a topology of the devices. An example of an OOBE process performed by the audio-data-communication application(s) 216 is described below with respect to FIG. 3. In other examples, the audio-data-communication application(s) 216 may determine a topology of the devices by automatically attempting to pair the user device 108 with the vehicle communication device 110 using different protocols (e.g., A2DP, HFP, etc.). In some examples, the audio-data-communication application(s) 216 may further cause the voice-enabled device 106 to "wake up" or begin listening for a wake word when the user device 108 comes within a threshold proximity to the voice-enabled device.

Once the audio-data-communication application(s) 216 have determined whether the devices are arranged in Topology A, B, C, or D (or another topology), the audio-data-communication application(s) 216 may begin sending and receiving various types of data according to the topology. For example, if the devices are arranged in topologies B or C, the audio-data-communication application(s) 216 may determine that call audio data is to be streamed using an HFP network between the user device 108 and the vehicle computing device 110. However, if the devices are arranged in topology A or D, then the audio-data-communication application(s) 216 may determine to stream call audio data to the voice-enabled device 106, which in turn sends the call audio data to the vehicle computing device 110 using a physical communication connection. With respect to music audio data, the audio-data-communication application(s) 216 may determine to stream or send music audio data to the vehicle computing device 110 using an A2DP network in Topology B, and stream or send music audio data to the voice-enabled device in Topologies A and C. Further, the audio-data-communication application(s) 216 may send and receive data with the voice-enabled device 106 using the BLE network, such as audio data representing a speech utterance 112 detected by the voice-enabled device 106, earcon data, TTS response audio data, command indications, and so forth. Additionally, for Topology D, the audio-data-communication application(s) 216 may determine that audio data is to be sent from the user device 108 to the vehicle computing device 110 using a physical communication connection.

The audio-data-communication application(s) 216 may further be configured to determine how to respond to commands received from the remote system 120. For instance, the audio-data-communication application(s) 216 may be configured to interpret and perform commands to conduct phone calls, schedule appointments, stream music audio data, order items from an online merchant website, and so forth.

As shown in FIG. 2, the user device 108 may further include various hardware components. The user device 108 may include or be associated with various input/output devices 218, such as displays, keyboards, navigation buttons, touch screens, LEDs, a mouse, haptic sensors, joysticks, and so forth, for receiving input from a user 104, and also for outputting information or data to a user 104. Additionally, the user device 108 may include one or more microphones 220 which may include sensors (e.g., transducers) configured to receive sound. The microphones 220 generate input signals for audio input (e.g., sound). For example, the microphones 220 may determine digital input signals for an utterance 112 of the user 104.

The user device 108 may have one or more network interfaces 222 such as a wireless or Wi-Fi network communications interface, an Ethernet communications interface, a cellular network communications interface, a Bluetooth communications interface, etc., for communications with the voice-enabled device 106, the vehicle computing device 110, and/or the remote system 120 over various types of networks, including wide-area network, local-area networks, private networks, public networks etc. In the case of a wireless communications interfaces, such interfaces may include radio transceivers and associated control circuits and logic for implementing appropriate communication protocols. The network interfaces 222 may utilize one or more antennas 224 of the user device to send and receive signals over the various networks.

The user device 108 may further include one or more loudspeakers 226 to output audio sounds represented by audio data. In some examples, the loudspeakers 226 may be used in conjunction with the microphones 220 to facilitate a conversation with a user 104. For instance, the user device 108 may stream audio data representing speech utterances of the user 104 to the remote system 120, and receive TTS response audio data to output using the loudspeakers 226 to facilitate a dialog with the user 104.

Further, the user device may include one or more physical connection input/output ports for sending and receiving data, such as audio data. The physical connection ports may include an auxiliary port 228, and USB port 230, or any other type of ports to facilitate a wired connection. However, other types of physical connection ports may be included in user device 108.

Figure 3:
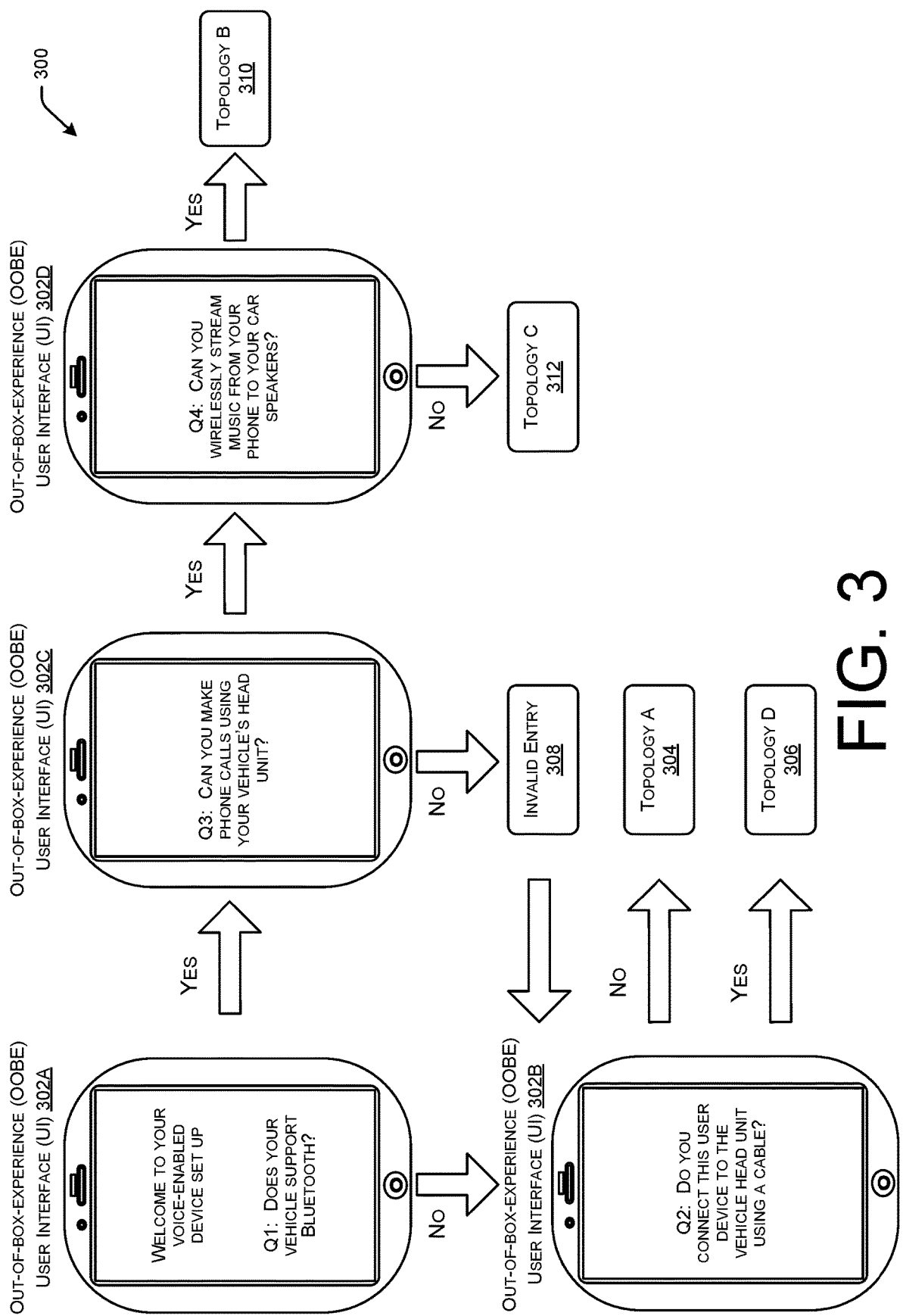
FIG. 3 illustrates a flow diagram of an example out-of-box experience (OOBE) performed with a user device and/or a voice-enabled device to determine a communication topology between the voice-enabled device, the user device, and a vehicle computing device.

FIG. 3 illustrates a flow diagram 300 of an example out-of-box experience (OOBE) performed with a user device 104 and/or a voice-enabled device 106 to determine a communication topology between the voice-enabled device 106, the user device 108, and a vehicle computing device 110. In some examples, the techniques described in FIG. 3 may be performed by the user device 108, the voice-enabled device 106, or a combination thereof. For instance, the audio-data-communication application(s) 216 may perform some or all of the operations of FIG. 3.

In some examples, the audio-data-communication application(s) 216 may perform an out-of-box experience (OOBE) to determine which a topology in which the devices in the interior of the vehicle are arranged. For example, the audio-data-communication application(s) 216 may cause an OOBE user interface (UI) 302A to be presented which includes a prompt asking the user "Does your vehicle support Bluetooth." If the vehicle does not support Bluetooth, the user 104 may provide input (e.g., speech utterance saying "no," input via a touch screen, etc.) to indicate that the vehicle does not support Bluetooth. If the vehicle does not support Bluetooth, the audio-data-communication application(s) 216 may present an OOBE UI 302B on a display associated with the user device 108 (e.g., input/output device(s) 218) which includes a prompt asking the user "Do you connect this user device to the vehicle head unit using a cable." If the user 104 indicates that they do not connect user device 108 to the vehicle head unit using a cable, then the audio-data-communication application(s) 216 determines at 304 that the devices 106, 108, and 110 are arranged in Topology A. However, if the user 104 indicates that they do connect the user device 108 to the vehicle head unit (e.g., vehicle computing device 110), the audio-data-communication application(s) 216 may determine that the devices 106, 108, and 110 are arranged according to Topology D.

In examples where the user 104 indicates that the vehicle head unit does support Bluetooth, the audio-data-communication application(s) 216 may present OOBE UI 302C which includes a prompt asking "Can you make phone calls using your vehicle's head unit?" If the user 104 indicates that they cannot make phone calls using their vehicle's head unit (e.g., vehicle computing device 110), then the audio-data-communication application(s) 216 determines that the user input an invalid entry at 308 because they had previously indicated via OOBE UI 302A that their car supports Bluetooth. If the entry is invalid at 308, the audio-data-communication application(s) 216 may proceed to present OOBE UI 302B to determine whether the devices are arranged in Topology A or D. Alternatively, if the user 104 indicates that the vehicle head unit does support phone calls, the audio-data-communication application(s) 216 may present OOBE UI 302D on the display of the user device 108. The OOBE UI 302D includes a prompt which asks the user 104 "Can you wirelessly stream music from your phone to your car speakers?" If the user indicates that they cannot stream music from their phone to their vehicle's head unit, the audio-data-communication application(s) 216 may determine that the devices 106, 108, and 110 are arranged in Topology C. Alternatively, if the user 104 indicates that they can stream music from their phone to the vehicle head unit, then the audio-data-communication application(s) 216 may determine that the voice-enabled device 106, user device 108, and vehicle computing device 110 are arranged in Topology B.

In this way, the audio-data-communication application(s) 216 is able to determine which topology to use for communicating data between the voice-enabled device 106, user device 108, and vehicle computing device 110 in an interior of the vehicle. It should be understood that this OOBE process 300 is merely an example, and any other method may be used to determine the topology, and the OOBE process 300 may be performed using any other device (e.g., voice-enabled device 106, vehicle computing device 110, etc.). In some examples, various auditory indications may further be used as part of the OOBE process, such as auditory prompts rather than visual, earcon audio data, TTS response audio data, and so forth. Further, different types of prompts may be presented to determine the topology of the devices.

Figure 4:
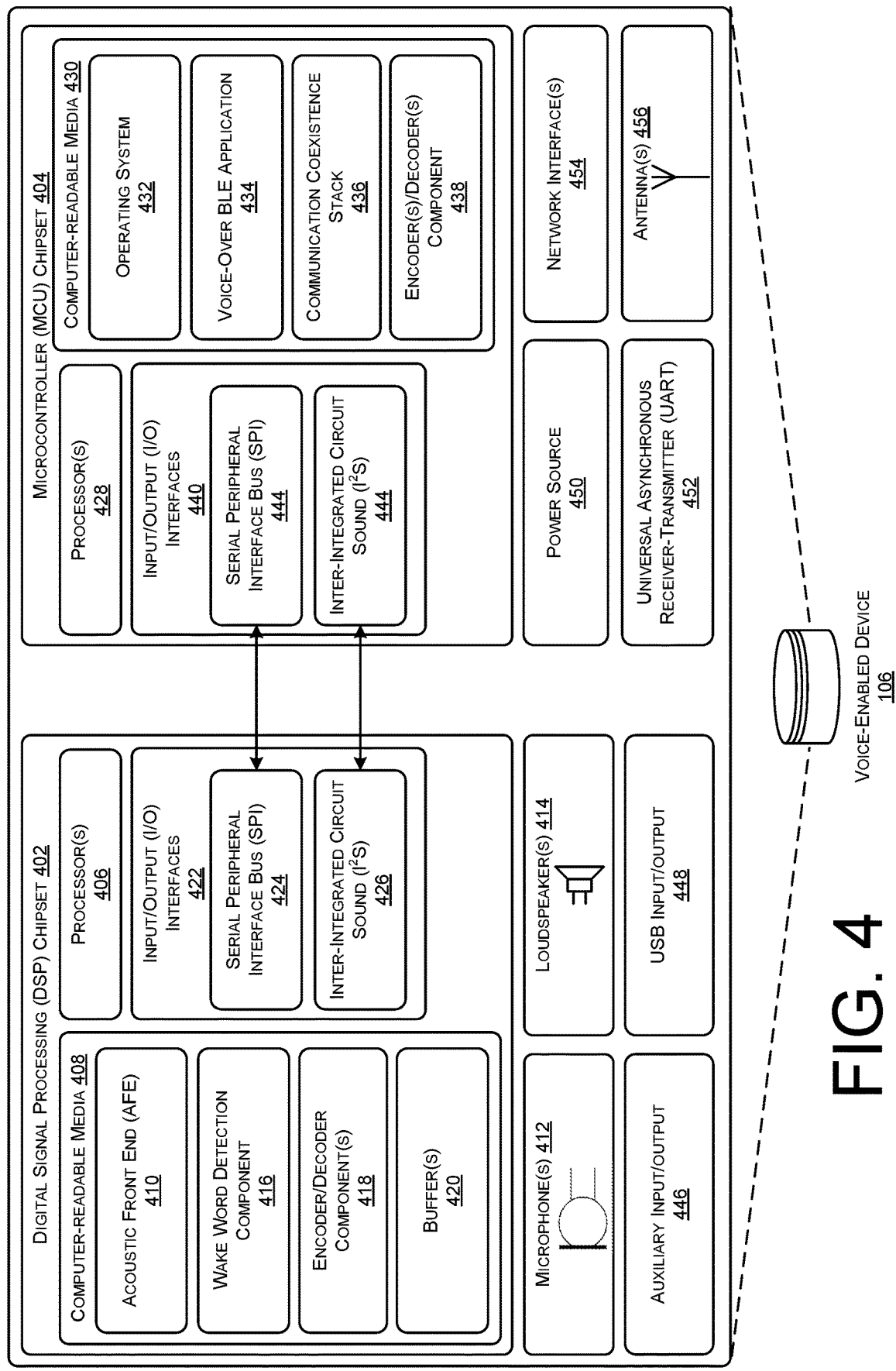
FIG. 4 illustrates a block diagram of an example architecture of a voice-enabled device which detects speech utterances, generates audio data representing the speech utterances, and transmits the audio data to a user device for transmission. The voice-enabled device may further send and receive audio data with a vehicle computing device in addition to the user device.

FIG. 4 illustrates a block diagram of an example architecture of a voice-enabled device 106 which detects speech utterances 112, generates audio data representing the speech utterances 112, and transmits the audio data to a user device 108 for transmission. The voice-enabled device 106 may further send and receive audio data with a vehicle computing device 110 in addition to the user device 108.

The voice-controlled device 106 may be implemented as a standalone device that is relatively simple in terms of functional capabilities with limited input/output components, memory, and processing capabilities. For instance, the voice-controlled device 106 may not have a keyboard, keypad, or other form of mechanical input. Nor does it have a display (other than simple lights, for instance) or touch screen to facilitate visual presentation and user touch input. Instead, the device 106 may be implemented with the ability to receive and output audio, a network interface (wireless or wire-based), power, and processing/memory capabilities. In some examples, the network interface may be limited in that it is not capable of communicating over certain networks, such as wide area networks. In certain implementations, a limited set of one or more input components may be employed (e.g., a dedicated button to initiate a configuration, power on/off, etc.). Nonetheless, the primary and potentially only mode of user interaction with the voice-enabled device 106 is through voice input and audible output. In some instances, the voice-enabled device 106 may simply comprise a microphone, a power source (e.g., a battery), and functionality for sending generated audio signals to another device.

In some examples, the voice-enabled device 106 may comprise a dual chipset solution including a digital signal processing (DSP) chipset 402 for performing processing of signals, such as acoustic signals, and a microcontroller (MCU) chipset 404 for handling various operations of the voice-enabled device 106, such as network connectivity and communication operations. The DSP chipset 402 may include one or more processors 406 for powering operations of the DSP chipset 402, and computer-readable media 408 which stores components of the DSP chipset 402. In some examples, the computer-readable media 408 may store an acoustic front end (AFE) 410 for performing various pre-processing techniques on acoustic signals (e.g., speech utterance 112) captured by one or more microphones 412 of the voice-enabled device 106.

The microphones 412 may include sensors (e.g., transducers) configured to receive sound. The microphones 412 may generate input signals for audio input (e.g., sound). For example, the microphones 412 may determine digital input signals for an utterance 112 of a user 104. In some instances, the microphones 412 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 412 may be in a planar configuration, or positioned apart in a non-planar three-dimensional region. In some implementations, the microphones 412 may include a spatially disparate array of sensors in data communication. For example, a networked array of sensors may be included. The microphones 412 may include omnidirectional microphones, directional microphones (e.g., shotgun microphones), and so on.

In some examples, the microphones 412 produce audio signals/data representing sound from the environment of the voice-enabled device 106, such speech utterances 112 by the user 104. The audio signals produced by the microphones 412 may comprise directional audio signals or may be used to produce directional audio signals, where each of the directional audio signals emphasizes audio from a different radial direction relative to the microphones 412.

The AFE 410 may include an acoustic echo cancellation or suppression component for reducing acoustic echo generated by acoustic coupling between the microphones 412 and one or more loudspeakers 414 of the voice-enabled device 106, or loudspeakers of other devices in the vehicle environment (e.g., user device 108, vehicle computing device 110, etc.). The AFE 410 may also include a noise reduction component for reducing noise in received audio signals, such as elements of microphone audio signals other than user speech. The AFE 410 may include one or more audio beamformers or beamforming components configured to generate directional audio signals that are focused in different directions. More specifically, the beamforming components may be responsive to audio signals from spatially separated microphone elements of the microphones 412 to produce directional audio signals that emphasize sounds originating from different areas of the environment of the voice-enabled device 106 or from different directions relative to the voice-enabled device 106.

The DSP chipset 402 may further include a wake word detection component 416 to detect a wakeword by performing wakeword detection on the audio data within which voice activity has been detected or on a directional audio signal within which the highest level of voice activity has been detected. As mentioned above, a predefined word, expression, or other sound can be used as a signal that the user 104 intends subsequent speech to be received and acted upon by the voice-enabled device 106. In some examples, the wakeword detection may be implemented using keyword spotting technology. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, the wake word detection component 416 may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression. As described above, the voice-enabled device 106 may begin storing and/or streaming audio data upon detecting a predefined wake word.

The computer-readable media 408 may further store one or more encoder/decoder components 418 for encoding and/or decoding data, such as audio data, upon transmission or upon receipt. For instance, the encoder/decoder component(s) 418 may be configured to encode and decode data using low-complicity subband codec (SBC) to facilitate communication of data for the Bluetooth A2DP. In such examples, the encoder/decoder component(s) 418 may include digital audio encoders to transfer audio data from the voice-enabled device 106 to the user device 108 and/or the vehicle computing device 110. Further, the encoder/decoder component(s) 418 may be configured to encode and/or decode data using an mSBC codec for various types of data, such as call audio data communicated using a Bluetooth HFP network. The computer-readable media 408 may further include various buffers 420 for storing data, such as audio data representing a speech utterance 112, call audio data and/music audio data being sent to the vehicle computing device 110, etc. In some examples, music audio data and/or call audio data may be stored in the buffers 420 may be used by the AFE 410 for purposes of echo cancellation.

The DSP chipset 402 may further include various input/output (I/O) interfaces 422 for communicating with the MCU chipset 404. For instance, the I/O interfaces 422 may include a serial peripheral interface bus (SPI) 424 for communicating data to the MCU chipset 404. Further, the I/O interfaces 422 may include an inter-integrated circuit sound (I2S) bus 426 for communicating various types of data to the MCU chipset 404. In some examples, the SPI 424 may be used to communicate audio data representing speech utterances 112, and also to receive device firmware upgrades from the MCU chipset 404. In various examples, the I2S interface 426 may be used to communicate music audio data for A2DP transmission as well as call audio data for HFP transmission. However, any type of data may be communicated using the I/O interfaces 422, and additional interfaces may be used to communicate data.

The MCU chipset 404 may also include one or more processors 428, as well as computer-readable media 430 storing various components. The computer-readable media 430 may store an operating system 432 configured to manage hardware and services within and coupled to the voice-enabled device 106. The MCU chipset 404 may also include a voice-over BLE (VoBLE) application 434 to communicate audio data, such as audio data representing speech utterances 112, over a BLE network 114 to the user device 108. The computer-readable media 430 may store a communication coexistence stack 436 which contains logic for performing communications using various protocols, such as A2DP and HFP with the user device 108, and for arbitrating between any potential simultaneous communications using differing protocols or profiles to avoid loss of packets. Further, the computer-readable media 430 may store one or more encoder/decoder components 428 for encoding and/or decoding data, such as audio data, upon transmission and/or upon receipt. For instance, the encoder/decoder component(s) 428 may be configured to encode and decode data using low-complexity subband codec (SBC) to facilitate communication of data for the Bluetooth A2DP. In such examples, the encoder/decoder component(s) 428 may include digital audio encoders to transfer audio data from the voice-enabled device 106 to the user device 108 and/or the vehicle computing device 110. Further, the encoder/decoder component(s) 418 may be configured to encode and/or decode data using an mSBC codec for various types of data, such as call audio data communicated using the Bluetooth HFP network.

Similar to the DSP chipset 402, the MCU chipset 404 may include one or more input/output (I/O) interfaces 440 for communicating with the DSP chipset 402, such as an SPI interface 442 as well as an I2S interface 444. The voice-enabled device 106 may include various hardware components as well, such as an auxiliary input/output 446 and a USB input/output 448 for communicating via physical connections with devices, such as a vehicle computing device 110. However, other types of physical connections may be included in the voice-enabled device 106.

The voice-enabled device 106 may further include a power source 450, such as a power cord and/or a battery source, for powering the components of the voice-enabled device 106. The voice-enabled device 106 may include a universal asynchronous receiver-transmitter (UART) 452 to provide an interface for various communications, such as a debugging interface. Additionally, the voice-enabled device 106 may have one or more network interfaces 454 such as a wireless or Wi-Fi network communications interface, an Ethernet communications interface, a cellular network communications interface, a Bluetooth communications interface, etc., for communications with the user device 108 over various types of networks, including local-area networks, private networks, public networks etc. In the case of a wireless communications interfaces, such interfaces may include radio transceivers and associated control circuits and logic for implementing appropriate communication protocols. The network interfaces 454 may utilize one or more antennas 456 of the user device 106 to send and receive signals over various networks.

Although not shown, the voice-enabled device 106 may include one or more lights, such as light emitting diodes (LEDS). In some examples, the voice-enabled device 106 may output light using the LEDs based on commands and/or control signals received from the user device 108. For instance, the voice-enabled device 106 may include instructions for multiple LEDs to output light according to different patterns, and/or colors, based on control signals received, commands received, and/or the type of data being sent and received at the voice-enabled device 106. As an example, the user device 108 may receive a command from the remote system 120 to conduct a telephone call via the vehicle computing device 110. The user device 108 may send a control signal and/or other indication of the command to the voice-enabled device 106. The control signal or indication of the command may cause the voice-enabled device 106 to output a certain pattern or color or lights using the LEDs that illustrates that the speech utterance 112 requesting a phone call was properly processed and is being performed. In this way, the voice-enabled device 106 may be controlled by the user device 108 to output light to indicate that commands were processed that were issued in speech utterances 112.

FIG. 5 illustrates an example signal flow diagram where a voice-enabled device 106 captures a speech utterance 112 of a user 104, and sends audio data representing the speech utterance 112 to a user device 108 to be transmitted to a remote speech-processing system (e.g., remote system 120). FIG. 5 further depicts an example where the user device 108 and/or the voice-enabled device 106 send additional audio data (e.g., music audio data) to a vehicle computing device 110.

FIG. 5 illustrates details of a scenario or process 500 where the vehicle computing device 110 is streaming music audio data while a speech utterance 112 from a user 104 is detected and processed. At 502, the user 104 issues a command via a speech utterance 112, which is detected by microphones 412 of the voice-enabled device 106. The voice-enabled device 106 may perform various processing operations on the captured speech utterance 112. For instance, the DSP chipset 402 may perform various acoustic front end processing, as well as wake word detection. If the speech utterance 112 comprises the wake word, the DSP chipset 402 may send the audio data representing the speech utterance 112 to the MCU chipset 404 using an SPI bus. At 504, for each topology A, B, C, and D, the voice-enabled device 106 sends, via a Bluetooth Low Energy (BLE) network, the audio data representing the speech utterance 112 to the user device 108.

At 506, for each of topologies A, B, C, and D, the user device 108 sends the audio data to the remote system 120 to be processed using speech-recognition techniques. The user device 108 then receives a command from the remote system 120 determined based on an intent of the speech utterance 112.

At 508, for topologies A and C, the user device 508 may be streaming music audio data to the voice-enabled device 106 using an A2DP network. At 510, for topologies A and C, the voice-enabled device 106 then sends, via the auxiliary output 446 (or other physical connection), the music audio data to the vehicle computing device 110, which in turn outputs the music audio. However, for topology B, the user device 108 transmits the music audio data directly to the vehicle computing device 110 using an A2DP network. Alternatively, at 514 and for topology D, the user device 108 sends the music audio data to the vehicle computing device 110 using a physical connection. The vehicle computing device 110 may then use vehicle loudspeakers to output the music audio data.

In various examples, the music audio data may be streamed from the user device 108, and ultimately output through the vehicle computing device 110, at a same time as the speech utterance 112 is captured, and the audio data is transmitted among the devices to the remote system 120. In such examples, the user device 108 may receive a command from the remote system 120 and perform the command (e.g., schedule an appointment, turn down the volume of the music, etc.) while the music audio data is being streamed.

The components illustrated in FIG. 5 are merely used as example components for performing the various operations, but more, or less, components may be used to perform the techniques described in FIG. 5.

FIG. 6 illustrates an example signal flow diagram where a voice-enabled device 106 captures speech utterances 112 of a user 104, and sends audio data representing the speech utterance 112 to a user device 108 to be transmitted to a remote speech-processing system (e.g., remote system 120). FIG. 5 further depicts an example where the user device 108 and/or the voice-enabled device 106 send additional audio data (e.g., call audio data) to a vehicle computing device 110.

FIG. 6 illustrates details of a scenario where the vehicle computing device 110 is conducting a phone call and communicating call audio data while a speech utterance 112 from a user 104 is detected and processed. At 602, the user issues a command in a speech utterance 112, which is detected by microphones 412 of the voice-enabled device 106. The voice-enabled device 106 may perform various processing operations on the captured speech utterance 112. For instance, the DSP chipset 402 may perform various acoustic front end processing, as well as wake word detection. If the speech utterance 112 comprises the wake word, the DSP chipset 402 may send the audio data representing the speech utterance 112 to the MCU chipset 404 using an SPI bus. By detecting the wake word, the voice-enabled device 106 is able to determine that a command was issued by the user 104, and that the speech utterance 112 is not merely part of the conversation in the phone call. At 604, for each topology A, B, C, and D, the voice-enabled device 106 sends, via a Bluetooth Low Energy (BLE) network, the audio data representing the speech utterance 112 to the user device 108.

At 606, for each of topologies A, B, C, and D, the user device 108 sends the audio data to the remote system 120 to be processed using speech-recognition techniques. The user device 108 then receives a command from the remote system 120 determined based on an intent of the speech utterance 112.

At 608, for topology A, the user device 108 may be streaming call audio data to the voice-enabled device 106 using an HFP network. The user device 108 may be receiving the call audio data from another voice-enabled device, or another user device, over one or more networks. Further, the user device 108 may be transmitting call audio data to the other user device which contains the speech utterances 112 of the user 104. At 610, for topology A, the voice-enabled device 106 then sends, via the auxiliary output 446 (or other physical connection), the call audio data to the vehicle computing device 110, which in turn outputs the call audio. However, for topologies B and C, the user device 108 transmits the call audio data directly to the vehicle computing device 110 using an HFP network. Alternatively, at 614 and for topology D, the user device 108 sends the call audio data to the vehicle computing device 110 using a physical connection. The vehicle computing device 110 may then use vehicle loudspeakers to output the call audio data.

In various examples, the call audio data may be streamed from the user device 108, and ultimately output through the vehicle computing device 110, at a same time as the speech utterance 112 is captured, and the audio data is transmitted among the devices to the remote system 120. In such examples, the user device 108 may receive a command from the remote system 120 and perform the command (e.g., schedule an appointment, turn down the volume of the audio, etc.) while the call audio data is being streamed.

The components illustrated in FIG. 6 are merely used as example components for performing the various operations, but more, or less, components may be used to perform the techniques described in FIG. 6.

Figure 7A:
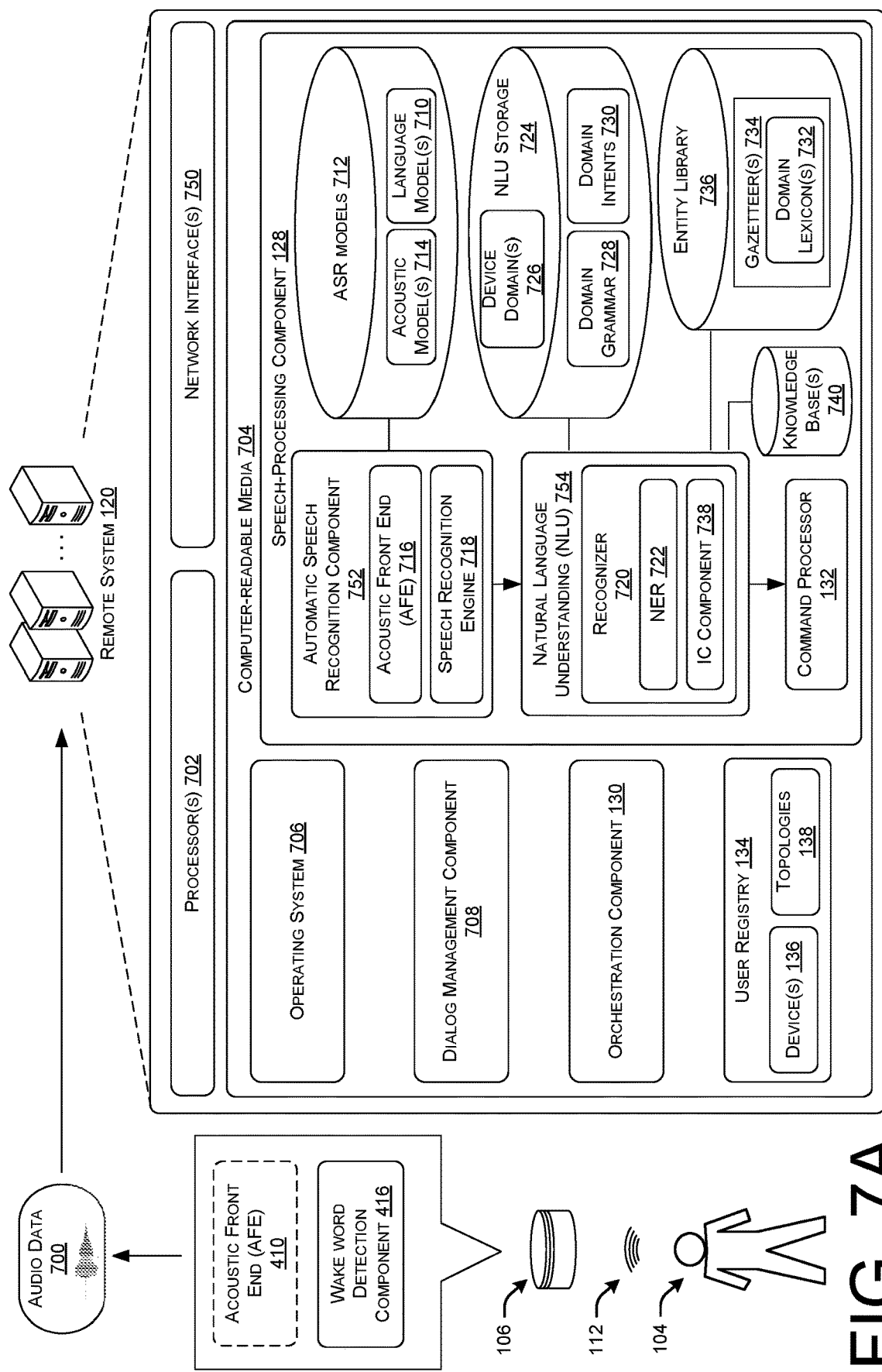
FIG. 7A illustrates a block diagram of an example architecture of a speech processing system which receives audio data from a voice-enabled device, and performs speech automatic speech recognition (ASR) and/or natural language understanding (NLU) techniques to determine an intent of the speech utterance.

FIG. 7A illustrates a block diagram of an example architecture of a speech processing system (e.g., remote system 120) which receives audio data from a voice-enabled device 106, and performs speech automatic speech recognition (ASR) and/or natural language understanding (NLU) techniques to determine an intent of the speech utterance 112.

FIG. 7A includes a conceptual diagram of how a speech utterance 112 can be processed, allowing a system to capture and execute commands spoken by a user 104, such as spoken commands that may follow a wakeword. The various components illustrated may be located on a same or different physical devices. Communication between various components illustrated in FIG. 7A may occur directly or across a network. An audio capture component, such as a microphone 412 of voice-enabled device 106, captures audio corresponding to a speech utterance 112. The voice-enabled device 106, using a wakeword detection component 416, then processes the speech utterance 112, or audio data corresponding to the speech utterance 112, to determine if a keyword (such as a wakeword) is detected in the speech utterance 112. Following detection of a wakeword, the voice-enabled device 106 sends audio data 700 corresponding to the speech utterance 112, to a computing device of the remote system 120 that includes an ASR component. The audio data 700 may be output from an acoustic front end (AFE) 410 located on the voice-enabled device 106 prior to transmission. Or, the audio data 400 may be in a different form for processing by a remote AFE 716, such as the AFE 416 located with the ASR component 752.

In various examples, the remote system 120 may include one or more processors 700 to power components, devices, and actions of the remote system 120, and one or more network interfaces 750 such as a wireless or Wi-Fi network communications interface, an Ethernet communications interface, a cellular network communications interface, a Bluetooth communications interface, etc., for communications by the remote system 120 over various types of networks, including wide-area network, local-area networks, private networks, public networks etc. In the case of a wireless communications interfaces, such interfaces may include radio transceivers and associated control circuits and logic for implementing appropriate communication protocols.

The remote system 120 may further include computer-readable media 704 which stores various components, components, or other executable software to perform various arbitration actions to determine which voice-enabled device is to respond to a command in the speech utterance 112. The computer-readable media may store an operating system 706 that is configured to manage hardware and services within and coupled to the remote system 120.

The computer-readable media 702 may further store a dialog management component 708 that is responsible for conducting speech dialogs with the user 104 in response to meanings or intents of user speech determined by the NLU component 754. The dialog management component 708 may include domain logic that is used to analyze the meaning of user speech and to determine how to respond to the user speech. The dialog management component 708 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 702 may further include the user registry 134 including the device indications 136 and topology indications 138. The remote system 120 may further include various components for processing a speech utterance 112, such as automatic speech recognition component 752 and natural language understanding component 754. The various components illustrated may be located on a same or different physical devices.

In some examples, audio data 700 may be received by the remote system 120 for speech processing for interpretation of the included speech utterance 112 (either for purposes of enabling voice-communications and/or for purposes of executing a command in the speech). The audio data 700 may include data corresponding to the wake word, or the portion of the audio data corresponding to the wake word may be removed by the voice-enabled device 106 prior to sending. Upon receipt by the remote system 120, the ASR component 752 may convert the audio data into text. The ASR component 752 transcribes audio data 700 into text data representing the words of the speech utterance 112 contained in the audio data 700. The text data may then be used by other components for various purposes, such as executing system commands, inputting data, determining audio data, etc. A speech utterance 112 in the audio data is input to a processor configured to perform ASR which then interprets the utterance based on the similarity between the utterance and pre-established ASR language models stored in an ASR model knowledge base (ASR Models Storage 712). For example, the ASR process may compare the input audio data with models for sounds (e.g., subword units or phonemes) and sequences of sounds to identify words that match the sequence of sounds spoken in the utterance of the audio data.

The different ways a speech utterance 112 may be interpreted (i.e., the different hypotheses) may each be assigned an ASR probability or an ASR confidence score representing the likelihood that a particular set of words matches those spoken in the utterance 112. The ASR confidence score may be based on a number of factors including, for example, the similarity of the sound in the utterance to models for language sounds (e.g., an acoustic model 714 stored in an ASR Models Storage 712), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 752 outputs the most likely text recognized in the audio data. The ASR component 752 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 716 and a speech recognition engine 718. The acoustic front end (AFE) 716 transforms the audio data from the microphone into data for processing by the speech recognition engine 718. The speech recognition engine 718 compares the speech recognition data with acoustic models 714, language models 710, and other data models and information for recognizing the speech conveyed in the audio data. The AFE 716 may reduce noise in the audio data and divide the digitized audio data into frames representing time intervals for which the AFE 716 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 716 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 718 may process the output from the AFE 716 with reference to information stored in speech/model storage (712). Alternatively, post front-end processed data (such as feature vectors) may be received by the device executing ASR processing from another source besides the internal AFE 716. For example, the voice-enabled device 106 may process audio data into feature vectors (for example using an on-device AFE 410) and transmit that information to a server across a network for ASR processing. Feature vectors may arrive at the remote system 120 encoded, in which case they may be decoded prior to processing by the processor executing the speech recognition engine 718.

The speech recognition engine 718 attempts to match received feature vectors to language phonemes and words as known in the stored acoustic models 714 and language models 710. The speech recognition engine 718 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 718 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 718 to other processing components, which may be local to the device performing ASR and/or distributed across the network(s). For example, ASR results in the form of a single textual representation of the speech, an N-best list including multiple hypotheses and respective scores, lattice, etc., may be sent to the remote system 120, for natural language understanding (NLU) processing, such as conversion of the text into commands for execution, either by the user device, by the remote system 120, or by another device (such as a server running a specific application like a search engine, etc.).

The NLU component 754 (e.g., server) may include various components, including potentially dedicated processor(s), memory, storage, etc. As shown in FIG. 7A, the NLU component 754 may include a recognizer 720 that includes a named entity recognition (NER) component 722 which is used to identify portions of query text that correspond to a named entity that may be recognizable by the system. A downstream process called named entity resolution links a text portion to a specific entity known to the system. To perform named entity resolution, the system may utilize gazetteer information 734 stored in entity library storage 736. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 754 takes textual input (such as the textual input determined by the ASR component 752) and attempts to make a semantic interpretation of the text. That is, the NLU component 754 determines the meaning behind the text based on the individual words and then implements that meaning. NLU component 754 interprets a text string to derive an intent or a desired action from the user as well as the pertinent pieces of information in the text that allow a device (e.g., voice-enabled device 106) to complete that action. For example, if a spoken utterance is processed using ASR component 752 and outputs the text "turn off the alarm" the NLU component 754 may determine that the user 104 intended that the voice-enabled device 106 be instructed to turn off an alarm sound being output. As another example, if the spoken utterance is processed using ASR component 752 and outputs the text "hang up the phone" the NLU component 754 may determine that the user 104 intended that the user device 108 be instructed to hang up a phone call that is being performed.

The NLU component 754 may process several textual inputs related to the same utterance. For example, if the ASR component 752 outputs N text segments (as part of an N-best list), the NLU component 754 may process all N outputs to obtain NLU results.

To correctly perform NLU processing of speech input, the NLU component 754 may be configured to determine a "domain" of the utterance so as to determine and narrow down which services offered by the endpoint device (e.g., remote system 120 or the voice-enabled device 106) may be relevant. For example, an endpoint device (e.g., voice-enabled device 106, user device 108, etc.) may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 722 receives a query in the form of ASR results and attempts to identify relevant grammars and lexical information that may be used to construe meaning. To do so, the NLU component 754 may begin by identifying potential domains that may relate to the received query. The NLU storage 724 includes a database of devices domains 726 which identify domains associated with specific devices. For example, the voice-enabled device 106 may be associated with domains for music, telephony, calendaring, contact lists, and device-specific communications, but not video. In addition, the device domains 726 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 720, language model and/or grammar databases 728, a particular set of domain intents/actions 730, and a particular personalized domain lexicon 732. Each gazetteer 734 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 738 parses the query to determine an intent or intents for each identified domain, where the intent corresponds to the action to be performed that is responsive to the query. Each domain is associated with a database (e.g., domain intents 730) of words linked to intents. For example, a music domain intent database 730 may link words and phrases such as "quiet," "volume off," and "mute" to a "mute" intent. A voice-message domain intent database, meanwhile, may link words and phrases such as "send a message," "send a voice message," "send the following," or the like. The IC component 738 identifies potential intents for each identified domain by comparing words in the query to the words and phrases in the domain intents database 730. In some instances, the determination of an intent by the IC component 738 is performed using a set of rules or templates that are processed against the incoming text to identify a matching intent.

In order to generate a particular interpreted response, the NER 722 applies the grammar models and lexical information associated with the respective domain to actually recognize a mention one or more entities in the text of the query. In this manner, the NER component 722 identifies "slots" (i.e., particular words in query text) that may be needed for later command processing. Depending on the complexity of the NER component 722, it may also label each slot with a type of varying levels of specificity (such as noun, place, city, artist name, song name, or the like). Each grammar model 728 includes the names of entities (i.e., nouns) commonly found in speech about the particular domain (i.e., generic terms), whereas the lexical information 732 from the gazetteer 734 is personalized to the user(s) and/or the device. For instance, a grammar model associated with the shopping domain may include a database of words commonly used when people discuss shopping.

The intents identified by the IC component 738 are linked to domain-specific grammar frameworks (included in 730) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (728) framework or frameworks may correspond to sentence structures such as "Send a message to {contact}," "Send a voice message to {contact}," "Send the following to {contact}," etc.

For example, the NER component 722 may parse the query to identify words as subject, object, verb, preposition, etc., based on grammar rules and/or models, prior to recognizing named entities. The identified verb may be used by the IC component 438 to identify intent, which is then used by the NER component 722 to identify frameworks. A framework for the intent of "send a message," meanwhile, may specify a list of slots/fields applicable to play the identified "contact" and any object modifier (e.g., specifying a device of the recipient) or the like. The NER component 722 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 722 may search the database of generic words associated with the domain (in the knowledge base 740). So, for instance, if the query was "send message to Joe," after failing to determine a last name for "Joe," the NER component 722 may search the domain vocabulary for the word "Joe." In the alternative, generic words may be checked before the gazetteer information, or both may be tried, potentially producing two different results.

The output data from the NLU component 754 (which may include tagged text, commands, etc.) may then be sent to the command processor 132. The destination command processor 132 may be determined based on the NLU output. For example, if the NLU output includes a command to send a message, the destination command processor 132 may be a message sending application, such as one located on the user device or in a message sending appliance, configured to execute a message sending command. If the NLU output includes a search request, the destination command processor 132 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 754 during runtime operations where NLU operations are performed on text (such as text output from an ASR component 752). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 720. Each recognizer may include various NLU components such as an NER component 722, IC component 438 and other components such as an entity resolver, or other components.

As noted above, multiple devices may be employed in a single remote system 120. In such a multi-device system, each of the devices may include different components for performing different aspects of the speech processing. The multiple devices may include overlapping components. The components of the voice-enabled device 106 and the remote system 120, as illustrated herein are exemplary, and may be located in a stand-alone device or may be included, in whole or in part, as a component of a larger device or system, may be distributed across a network or multiple devices connected by a network, etc.

Figure 7B:
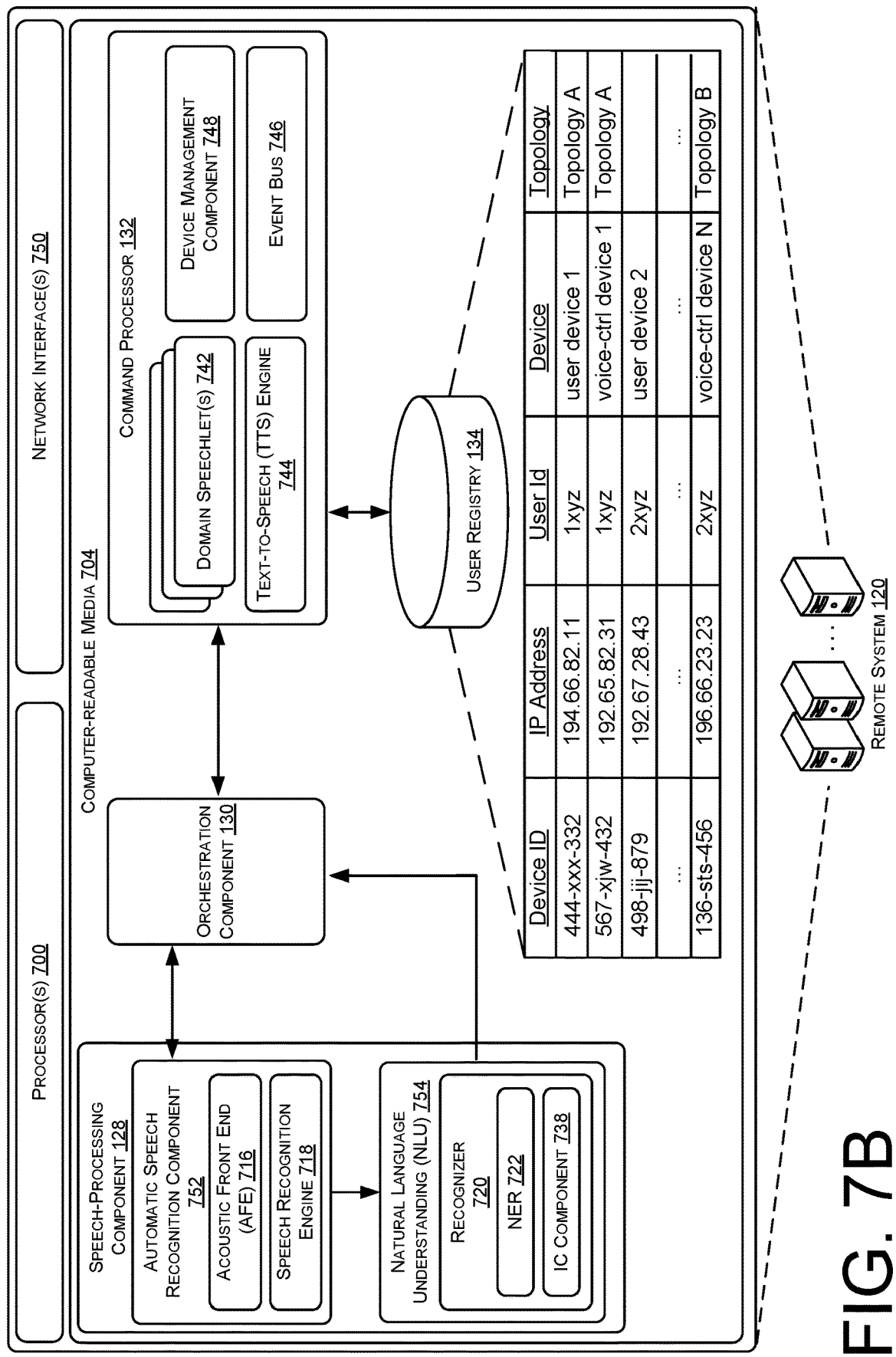
FIG. 7B illustrates a block diagram of an example architecture of a speech processing system including a command processor configured to generate a command and/or additional content that is responsive to an intent of the speech utterance.

FIG. 7B illustrates a block diagram of an example architecture of the remote system 120 including the command processor 132 configured to generate a command that the voice-enabled device 106 and/or user device 108 uses to respond to the speech utterance 112. As illustrated in FIG. 7B, the remote system 120, including the orchestration component 130 and a speech processing component 128 comprising the ASR component 752 and the NLU component 754, may be coupled to the command processor 132.

The command processor 132 and/or NLU component 754 may determine a domain based on the intent and, based on this determination, route the request corresponding to the audio data to the appropriate domain speechlet, such as the illustrated domain speechlets 742. The domain speechlet 742 may comprise any type of device or group of devices (e.g., hardware device, virtual devices or partitions, server, etc.), and may receive the text data and/or an intent associated with the audio data 700 and determines how to respond to the request. For instance, the intent for a command "please hang up my phone call" may be routed to a smart phone domain speechlet 742 which controls devices connected to the voice-enabled device 106, such as a user device 108 through which a phone call is being conducted. The smart phone domain speechlet 742 may determine a command to generate based on the intent of the user 104 to hang up a phone call. Additionally, the smart phone domain speechlet 742 may determine additional content, such as TTS response audio data, to be output by the vehicle computing device 110 and/or the voice-enabled device 106, such as "we have hung up your phone call."

Various types of domain speechlets 742 may be used to determine how the devices 106, 108, and/or 110 are to respond to the speech utterance 112, as well as the appropriate response and potential additional content (e.g., TTS response audio data, earcon audio data, etc.). For example, the domain speechlets 742 may include a third party skills domain speechlet 742 which may handle intents associated with gaming, productivity, etc., a music domain speechlet 742 which may handle intents associated with music play requests (e.g., Amazon Music, Pandora, Spotify, iHeart, etc.), a video domain speechlet 742 which may handle intents associated with video play requests (e.g., Amazon Video, HBO, Netflix, Hulu, etc.), a household organization domain speechlet 742 which may handle intents associated with household activities (e.g., calendars, reminders, timers, etc.), a smart device domain speechlet 742 which may handle intents associated with controlling smart devices (e.g., controlling lights, door locks, vehicle monitoring, etc.), an automotive domain speechlet 742, a shopping domain speechlet 742 which may handle shopping requests (e.g., making a shopping list, ordering items online, etc.), and/or a weather domain speechlet 742 which may handle requests for weather forecasts (e.g., providing a URL to a weather website, providing weather related images and/or videos, etc.).

After the domain speechlet 742 generates the appropriate command based on the intent of the user 104, and/or provides additional content, such as audio data, to be output by one of the voice-enabled device 106, user device 108, and/or vehicle computing device 110 (e.g., "we have hung up your phone call"), the domain speechlet 742 may provide this information back to the command processor 132, which in turns provides some or all of this information to a text-to-speech (TTS) engine 744. The TTS engine 744 then generates an actual audio file for outputting the second audio data determined by the domain speechlet 742 (e.g., "we have hung up your phone call", or "we have turned off your alarm . . ."). After generating the file (or "TTS response audio data"), the TTS engine 744 may provide this data back to the remote system 120.

The remote system 120 may then publish (i.e., write) some or all of this information to an event bus 746. That is, the remote system 120 may provide information regarding the initial request (e.g., the speech, the text, the domain/ intent, etc.), the response to be provided to the voice-enabled device 106, user device 108, and/or vehicle computing device 110 (e.g., the command to hang up a phone call, the command to turn off an alarm, etc.), or any other information pertinent to the interaction between the user device 108 and the remote system 120 to the event bus 746.

Within the remote system 120, one or more components or services may subscribe to the event bus 746 so as to receive information regarding interactions between user devices and the remote system 120. In the illustrated example, for instance, the device management component 748 may subscribe to the event bus 446 and, thus, may monitor information regarding these interactions. In some examples, monitoring information in the event bus 746 may comprise communications between various components of the remote system 120. In some examples, the event bus 746 may "push" or send indications of events and/or device state data to the different components. Additionally, or alternatively, the event bus 746 may be "pulled" where the command processor 132 sends requests to the event bus 746. The event bus 746 may store indications of the device states for the devices 106, 108, and/or 110 such as in a database (e.g., user registry 134).

The device management component 748 functions to monitor information published to the event bus 746 and identify events that may trigger action. For instance, the device management component 748 may identify (e.g., via filtering) those events that result in an action to be taken, such as streaming music audio data or performing a call. The device management component 748 may determine whether a particular event identified is associated with supplemental content. That is, the device management component 748 may write, to a datastore, indications of which types of events and/or which primary content or responses are associated with supplemental content (e.g., TTS response audio data, earcon audio data, etc.). In some instances, the remote system 120 may provide access to third-party developers to allow the developers to register supplemental content for output on secondary devices for particular events and/or primary content. For example, if a device 106, 108, and/or 110 is to output that the weather will include thunder and lightning, the device management component 748 may store an indication of supplemental content such as thunder sounds, pictures/animations of lightning and the like. In another example, if a device 106, 108, and/or 110 is outputting information about a particular fact (e.g., "a blue whale is the largest mammal on earth . . . "), then a secondary device 112, such as display device, may be configured to provide supplemental content such as a video or picture of a blue whale. In these and other examples, the device management component 748 may store an association between the primary response or content (e.g., outputting of information regarding the world's largest mammal) and corresponding supplemental content (e.g., the audio data, image data, or the like). In some instances, the device management component 748 can also indicate which types of secondary devices are to output which supplemental content. For instance, in the instant example, the device management component 748 may store an indication that secondary devices of a class type "tablet" are to output a picture of a blue whale. In these and other instances, meanwhile, the device management component 748 may store the supplemental content in association with secondary-device capabilities (e.g., devices with loudspeakers output the audio commentary, devices with screens output the image, etc.).

Finally, the device management component 748 may determine how to transmit response and/or supplement content (and/or information acquiring the content) to the user device 108 and/or the voice-enabled device 106. To make this determination, the device management component 748 may determine a device type of the devices 108 and/or 106, capabilities of the device(s), or the like, potentially as stored in the user registry 134. In some instances, the device management component 748 may determine that a particular device 108 is able to communicate directly with the remote system 120 (e.g., over WiFi) and, thus, the device management component 748 may provide the response and/or content directly over a network to the device 108.

The computer-readable media 702 may further include the user registry 134 that includes data regarding user profiles as described herein. The user registry 134 may be located part of, or proximate to, the remote system 120, or may otherwise be in communication with various components, for example over a network. The user registry 134 may include a variety of information related to individual users, accounts, etc. that interact with the voice-enabled devices 106, and the remote system 120. For illustration, the user registry 134 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device.

As used herein, a processor, such as processor(s) 124, 202, 406, 428 and/or 702, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 124, 202, 406, 428 and/or 702 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 124, 202, 406, 428 and/or 702 may possess its own local memory, which also may store program components, program data, and/or one or more operating systems.

As described herein, computer-readable media 126, 204, 408, 430, and/or 704 may include volatile and nonvolatile memory, removable and non-removable media implemented in any method or technology for storage of information, such as computer-readable instructions, data structures, program component, or other data. Such computer-readable media 126, 204, 408, 430, and/or 704 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 124, 202, 406, 428 and/or 702 to execute instructions stored on the computer-readable media 126, 204, 408, 430, and/or 704. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 126, 204, 408, 430, and/or 704, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Figure 8:
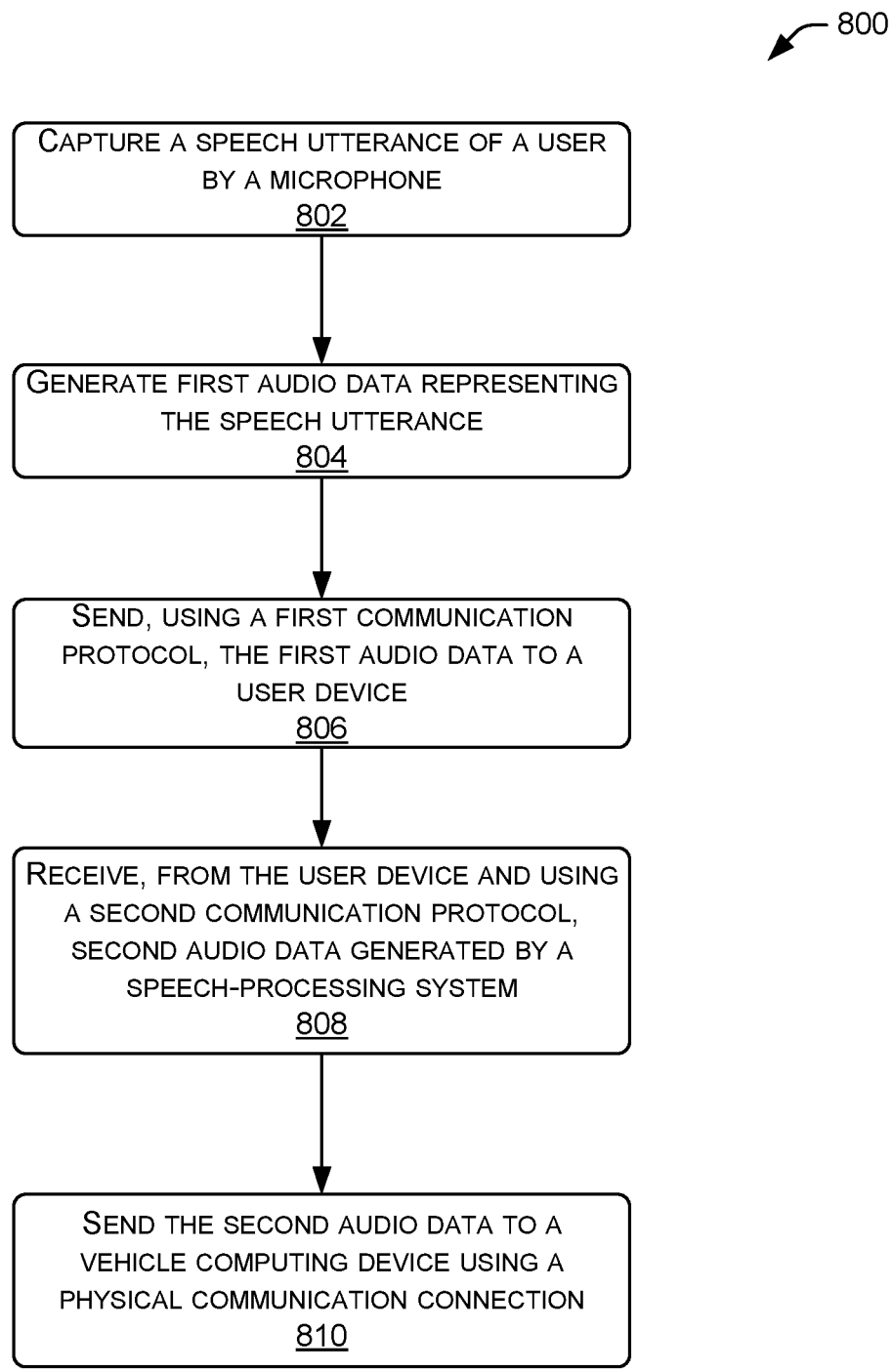
FIG. 8 illustrates a flow diagram of an example method for a voice-enabled device to capture a speech utterance, send audio data representing the speech utterance to a user device, and send audio data to a computing device according to various topologies of devices in a vehicle environment.

FIG. 8 illustrates a flow diagram of an example method 800 for a voice-enabled device 106 to capture a speech utterance 112, send audio data representing the speech utterance to a user device 108, and send audio data to a vehicle computing device 110 according to various topologies of devices in a vehicle environment. In some examples, the method 800 may generally be applied for instances where the voice-enabled device 106, user device 108, and vehicle computing device 110 are arranged in topologies A or C.

At 802, the voice-enabled device 106 may capture a speech utterance 112 of a user 104 by a microphone 412. In some examples, the voice-enabled device 106 may be configured with a wake word detection component 416 which uses various techniques to detect a wake word. At 804, the voice-enabled device 106 may generate first audio data representing the speech utterance 112. For instance, the microphones 412 of the voice-enabled device 106 may convert the acoustic signals of the speech utterance 112 into a digital format for processing.

At 806, the voice-enabled device 106 may send the first audio data to a user device 108 using a first communication protocol. In some examples, the communication protocol may comprise a Bluetooth Low Energy profile (BLE). In such examples, the voice-enabled device 106 may include a voice-over BLE application for sending audio data representing speech utterances 112 over BLE, and the user device 108 may similarly include a VoBLE component 210 for receiving the audio data over the BLE.

At 808, the voice-enabled device 106 may receive, from the user device 108 and using a second communication protocol, second audio data. In various examples, the second audio data may comprise call audio data, music audio data, TTS response audio data, or other types of audio data. The type of audio data may be determined based on a command included in the speech utterance. For example, the command may be to stream music, in which case the second audio data comprises music audio data, and the second communication protocol comprises the Bluetooth A2DP. In some examples, the command may be to conduct a phone call, and the second communication protocol may comprise the Bluetooth HFP.

At 810, the voice-enabled device 106 may send the second audio data to a vehicle computing device 110 using a physical communication connection. For instance, the vehicle computing device 110 may be unable to communicate wirelessly, and a physical connection (e.g., auxiliary, USB, etc.) may be used by the voice-enabled device 106 to send the second audio data to the vehicle computing device 110.

Figure 9:
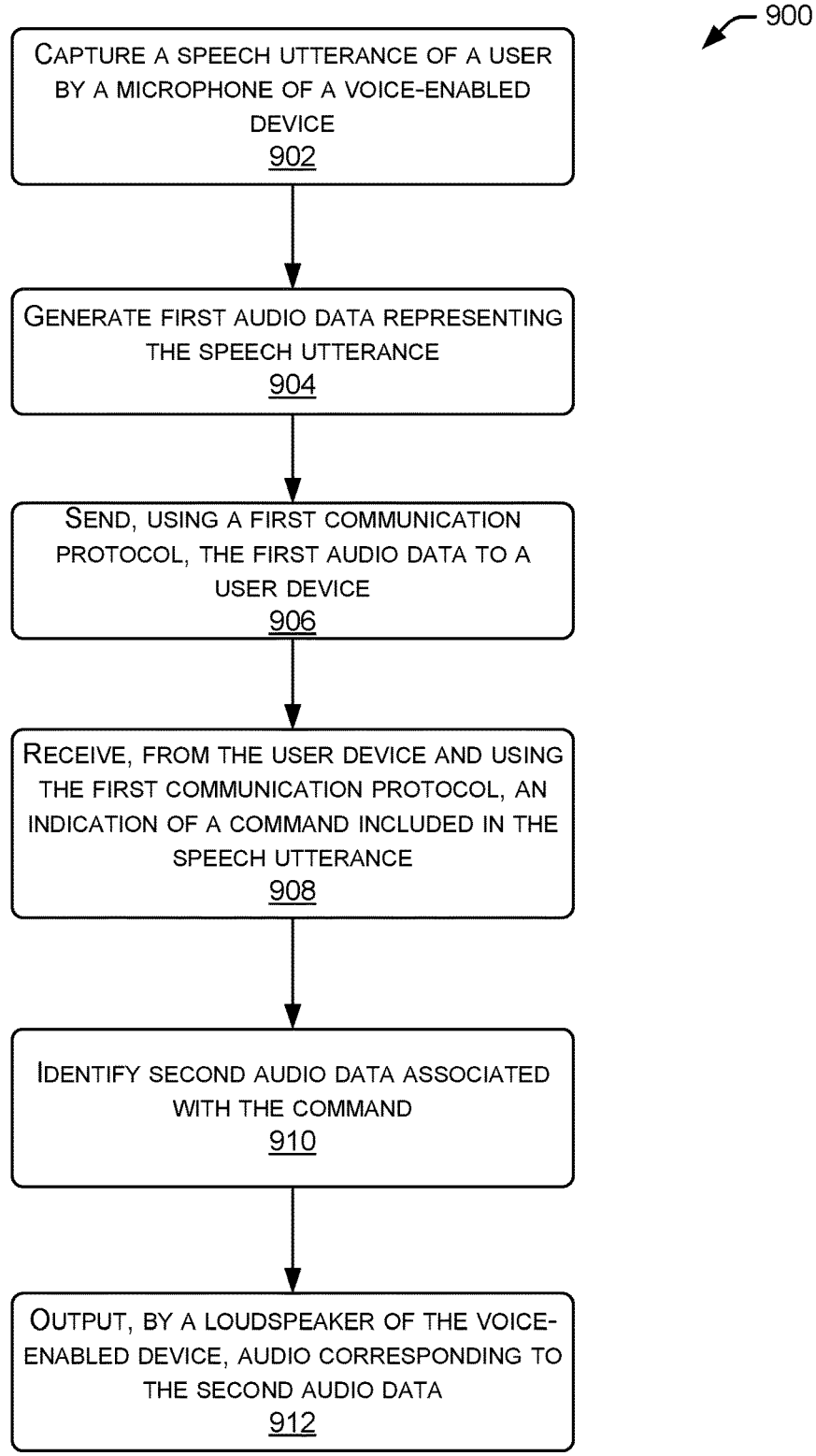
FIG. 9 illustrates a flow diagram of an example method for a voice-enabled device to capture a speech utterance, send audio data representing the speech utterance to a user device, and output audio based on a command received from the user device.

FIG. 9 illustrates a flow diagram of an example method 900 for a voice-enabled device 106 to capture a speech utterance 112, send audio data representing the speech utterance 112 to a user device 108, and output audio based on a command received from the user device 108. In various examples, the techniques of method 900 may generally be applied for instances where the voice-enabled device 106, user device 108, and vehicle computing device 110 are arranged in topologies B or D.

At 902, the voice-enabled device 106 may capture a speech utterance 112 of a user 104 by a microphone 412. In some examples, the voice-enabled device 106 may be configured with a wake word detection component 416 which uses various techniques to detect a wake word. At 904, the voice-enabled device 106 may generate first audio data representing the speech utterance 112. For instance, the microphones 412 of the voice-enabled device 106 may convert the acoustic signals of the speech utterance 112 into a digital format for processing.

At 906, the voice-enabled device 106 may send the first audio data to a user device 108 using a first communication protocol. In some examples, the communication protocol may comprise a Bluetooth Low Energy profile (BLE). In such examples, the voice-enabled device 106 may include a voice-over BLE application for sending audio data representing speech utterances 112 over BLE, and the user device 108 may similarly include a VoBLE component 210 for receiving the audio data over the BLE.

At 908, the voice-enabled device 106 may receive, from the user device 108 and using the first communication protocol, an indication of a command included in the speech utterance 112. For instance, the remote system 120 may have returned a command to the user device 108, and the user device 108 may indicate what the command is to the voice-enabled device 106.

In some examples, the indication of the command included in the speech utterance comprises a control message from the user device 108 and to the voice-enabled device 106. Depending on the topology, the control message may be sent to the voice-enabled device 106 using the BLE network 114. The control message may comprise a message that causes the voice-enabled device 106 to receive audio data from the user device 108, and send the audio data to the vehicle computing device 110. For instance, the devices 106, 108, and 110 may be arranged in Topology A or Topology C and receive a control message from the voice-enabled device 106 to send audio data to the vehicle computing device 110. However, the physical connection 140 between the voice-enabled device 106 and the vehicle computing device 110 may have been disconnected. In such examples, the voice-enabled device 106 may determine that the vehicle computing device 110 is no longer connected through the physical connection 140.

At 910, the voice-enabled device 106 may identify second audio data associated with the command. In various examples, the second audio data may generally represent an earcon that is to be output by a loudspeaker of the voice-enabled device 106. The earcon audio data may be stored locally at the voice-enabled device 106, or received from the user device 108 after being transmitted from the remote system 120. In other examples, the second audio data may represent a TTS response generated based on the command that is responsive to the speech utterance 112.

In the example where the voice-enabled device 106 receives the control message from the user device 108 to send audio data to the vehicle computing device 110 using Topology A or C, but the physical connection 140 is not connected, the voice-enabled device 106 may identify a specific earcon. For instance, the voice-enabled device 106 may identify an "error" earcon which indicates that the voice-enabled device 106 is unable to send the audio data to the vehicle computing device 110. There may be a specific earcon stored locally at the voice-enabled device 106 which indicates an error due to the voice-enabled device 106 not being connected to the vehicle computing device 110 if required in Topologies A or C.

At 912, the voice-enabled device 106 may output, by a loudspeaker of the voice-enabled device 106, audio corresponding to the second audio data. In some examples, the voice-enabled device 106 may output the audio at a same time as the user device 108 is streaming other audio data (e.g., call audio data, music audio data, etc.) to the vehicle computing device 110 through a different communication connection.

In the example where the voice-enabled device 106 receives the control message from the user device 108 to send audio data to the vehicle computing device 110 using Topology A or C, but the physical connection 140 is not connected, the voice-enabled device 106 may output the specific earcon that indicates the error.

Figure 10:
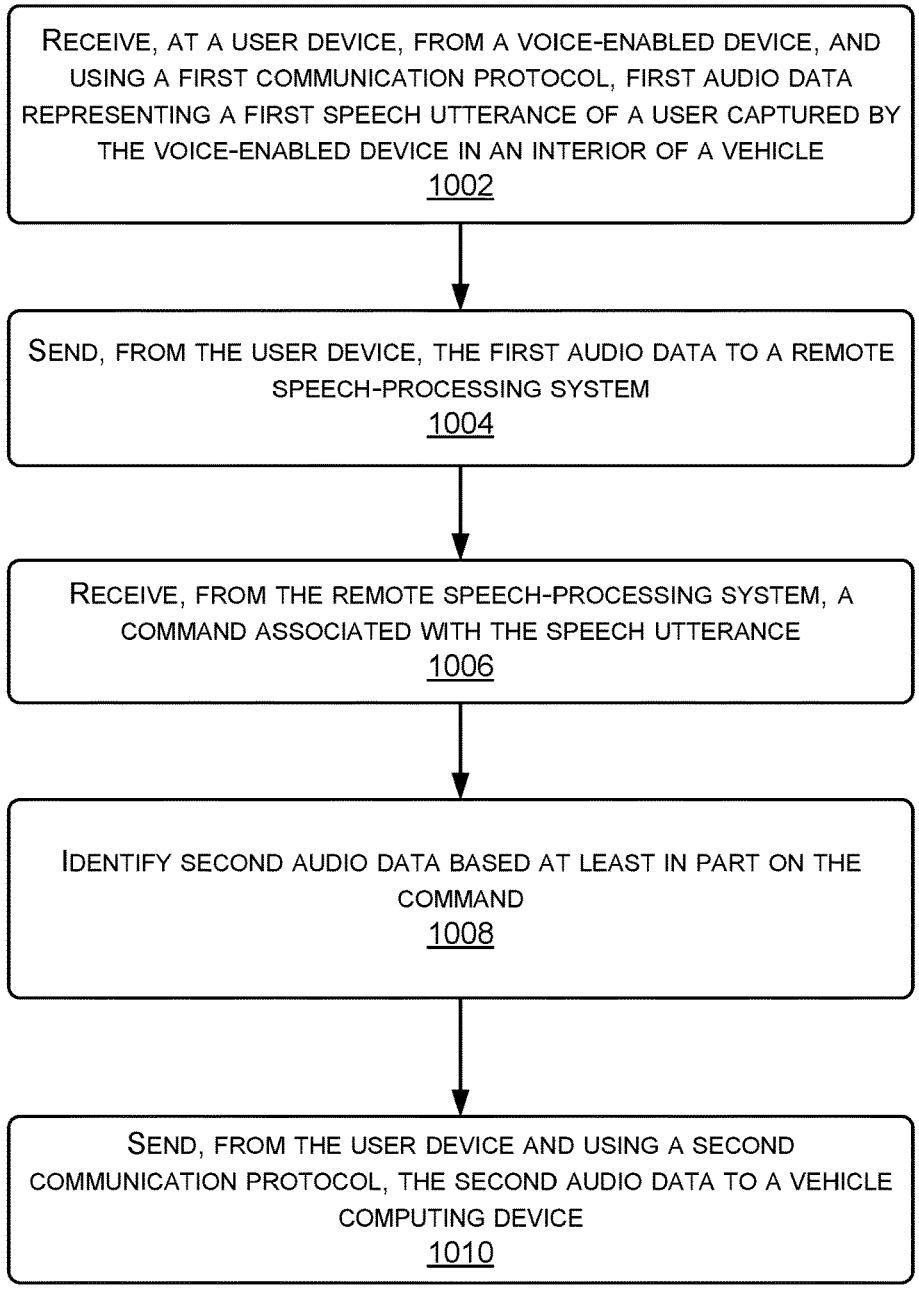
FIG. 10 illustrates a flow diagram of an example method for a user device to receive first audio data representing a speech utterance from a voice-enabled device, sending the first audio data to a remote speech-processing system, receiving a command from the speech processing system, and sending second audio data to a vehicle computing device according to various topologies of devices in a vehicle environment.

FIG. 10 illustrates a flow diagram of an example method 1000 for a user device 108 to receive first audio data representing a speech utterance 112 from a voice-enabled device 106, sending the first audio data to a remote speech-processing system (e.g., remote system 120), receiving a command from the speech processing system, and sending second audio data to a vehicle computing device 110 according to various topologies of devices in a vehicle environment.

At 1002, a user device 108 may receive, from a voice-enabled device 106, and using a first communication protocol, first audio data representing a first speech utterance of a user 104 captured by the voice-enabled device in an interior of a vehicle. In some examples, the first communication protocol may comprise a Bluetooth Low Energy Profile.

At 1004, the user device 108 may send, from the user device, the first audio data to a remote speech-processing system (e.g., remote system 120). In some examples, the user device may send, or transmit, the first audio data over one or more networks, such as a wide area network.

At 1006, the user device 108 may receive, from the remote speech-processing system, a command associated with the speech utterance. At 1008, the user device 106 may identify second audio data based at least in part on the command. At 1010, the user device 108 may send, using a second communication protocol, the second audio data to a vehicle computing device.

In some examples, the method 1000 may further include determining that the command comprises an instruction to perform a phone call with a contact associated with the user, and initiating a phone call between the user device and a contact device associated with the contact. The user device 108 may then receive, from the contact device, call audio data. In this example, the step 1010 may comprise transmitting, using a Hands-Free Profile (HFP) of a Bluetooth protocol, the call audio data to the vehicle computing device. In various examples, another speech utterance may be detected, using wake word detection, while the call audio data is being transmitted.

In various examples, the method may further comprise determining, at the user device 108, that the command comprises an instruction to play music audio data, wherein the command further includes an indication of a storage location of the music audio data, and obtaining the music audio data from the storage location. For instance, the user device 108 may obtain music audio data from an online music streaming service. In such examples, the step 1010 performed by the user device 108 may comprise transmitting, using an Advanced Audio Distribution Profile (A2DP) of a Bluetooth protocol, the music audio data to the vehicle computing device.

In even further examples, the method 1000 may further comprise receiving the second audio data from the remote speech-processing system, wherein the second audio data represents one or more machine-generated words that are responsive to the command of the speech utterance (e.g., TTS response audio data). In such an example, step 1010 may comprise transmitting, using an Advanced Audio Distribution Profile (A2DP) of a Bluetooth protocol, the second audio data to the vehicle computing device 110.

Depending on the topology, the second audio data may be transmitted using a physical connection to the vehicle computing device 110.

Figure 11:
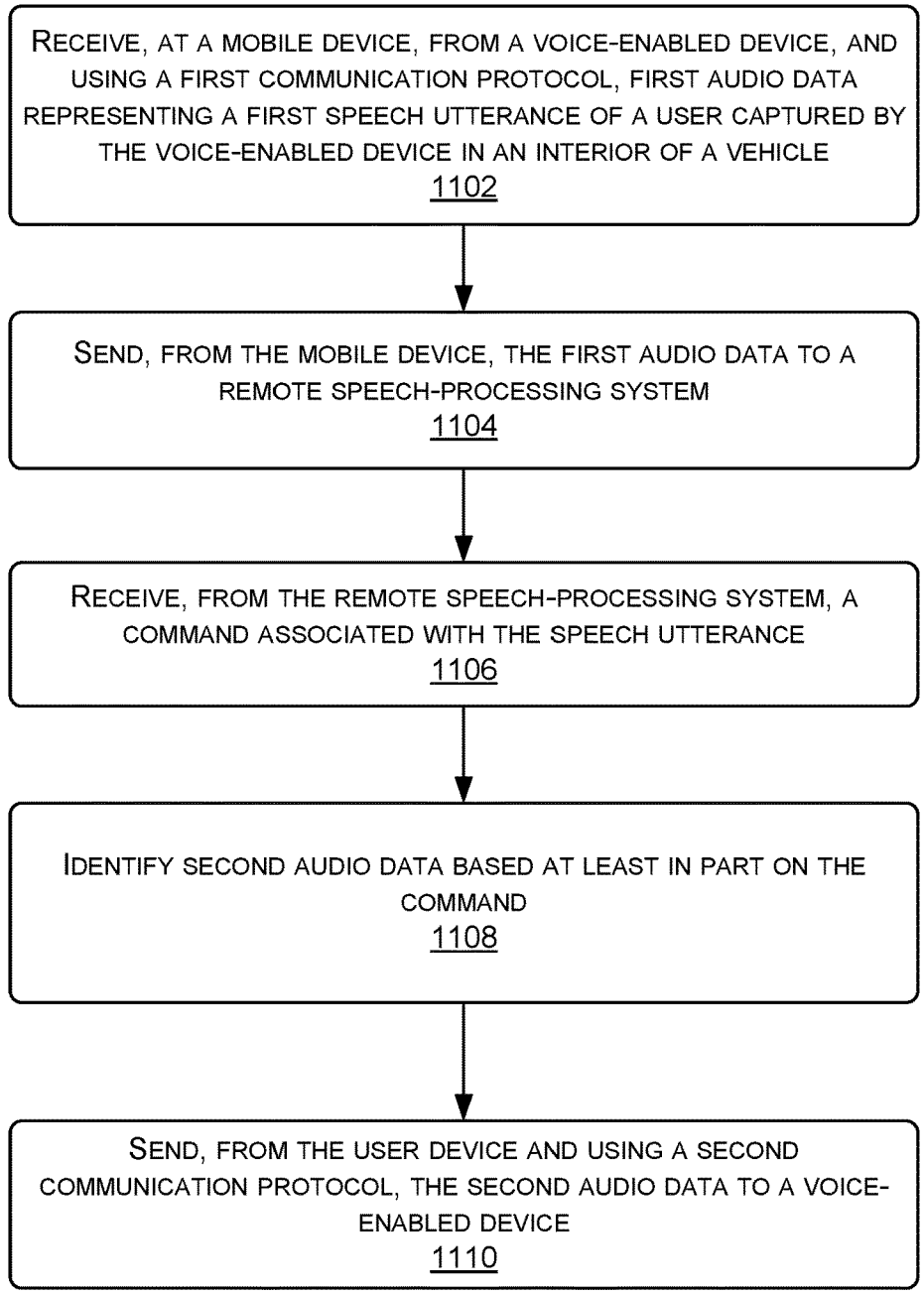
FIG. 11 illustrates a flow diagram of an example method for a user device to receive first audio data representing a speech utterance from a voice-enabled device, sending the first audio data to a remote speech-processing system, receiving a command from the speech processing system, and sending second audio data to the voice-enabled device according to various topologies of devices in a vehicle environment.

FIG. 11 illustrates a flow diagram of an example method 1100 for a user device 108 to receive first audio data representing a speech utterance 112 from a voice-enabled device 106, sending the first audio data to a remote speech-processing system (e.g., remote system 120), receiving a command from the speech processing system, and sending second audio data to the voice-enabled device 106 according to various topologies of devices in a vehicle environment.

At 1102, the user device 108 may receive, from a voice-enabled device 106, and using a first communication protocol, first audio data representing a first speech utterance of a user 104 captured by the voice-enabled device in an interior of a vehicle. In some examples, the first communication protocol may comprise a Bluetooth Low Energy Profile.

At 1104, the user device 108 may send, from the user device, the first audio data to a remote speech-processing system (e.g., remote system 120). In some examples, the user device may send, or transmit, the first audio data over one or more networks, such as a wide area network.

At 1106, the user device 108 may receive, from the remote speech-processing system, a command associated with the speech utterance. At 1108, the user device 106 may identify second audio data based at least in part on the command. At 1110, the user device 108 may send, using a second communication protocol, the second audio data to the voice-controlled device 106.

In some examples, the method 1100 may further include determining that the command comprises an instruction to perform a phone call with a contact associated with the user, and initiating a phone call between the user device and a contact device associated with the contact. The user device 108 may then receive, from the contact device, call audio data. In this example, the step 1110 may comprise transmitting, using a Hands-Free Profile (HFP) of a Bluetooth protocol, the call audio data to the vehicle computing device. In various examples, another speech utterance may be detected, using wake word detection, while the call audio data is being transmitted.

In various examples, the method may further comprise determining, at the user device 108, that the command comprises an instruction to play music audio data, wherein the command further includes an indication of a storage location of the music audio data, and obtaining the music audio data from the storage location. For instance, the user device 108 may obtain music audio data from an online music streaming service. In such examples, the step 1110 performed by the user device 108 may comprise transmitting, using an Advanced Audio Distribution Profile (A2DP) of a Bluetooth protocol, the music audio data to the vehicle computing device.

In even further examples, the method 1100 may further comprise receiving the second audio data from the remote speech-processing system, wherein the second audio data represents one or more machine-generated words that are responsive to the command of the speech utterance (e.g., TTS response audio data). In such an example, step 1110 may comprise transmitting, using an Advanced Audio Distribution Profile (A2DP) of a Bluetooth protocol, the second audio data to the vehicle computing device 110.

Depending on the topology, the second audio data may be transmitted using a physical connection to the vehicle computing device 110.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A voice-controlled device disposed in an interior of a vehicle, the voice-controlled device comprising:
    a microphone;
    a first input/output (I/O) interface to communicatively couple, by a physical communication connection, the voice-controlled device to a second I/O interface of a vehicle computing device of the vehicle, the vehicle computing device coupled to one or more loudspeakers;
    one or more processors; and
    computer-readable media storing computer-executable instructions that, when executed by the one or more processors, cause the one or more processors to perform operations comprising:
        capturing, using the microphone, first audio representing a speech utterance;
        generating first audio data representing the speech utterance;
        sending, using a Bluetooth Low Energy Profile (BLE) of a Bluetooth protocol, the first audio data to a user mobile device, wherein the user mobile device sends the first audio data to a remote speech-processing system;
        receiving, from the user mobile device and using an Advanced Audio Distribution Profile (A2DP) of the Bluetooth protocol, second audio data, wherein the second audio data is received by the user mobile device from a network-based music service, and wherein the remote speech-processing system determines an intent of the speech utterance is to stream the second audio data and sends a command to the user mobile device to stream the second audio data; and
        sending, via the physical communication connection, the second audio data to the vehicle computing device to be output by the one or more loudspeakers of the vehicle computing device.

2. The voice-controlled device of claim 1, further comprising a loudspeaker, and the operations further comprising:
    receiving, from the user mobile device and using the BLE of the Bluetooth protocol, a control message, wherein the control message includes an instruction that the voice-controlled device output an auditory icon;
    outputting, using the loudspeaker of the voice-controlled device, the auditory icon.

3. The voice-controlled device of claim 1, further comprising multiple light sources, and the operations further comprising:
    receiving, from the user mobile device and using the BLE of the Bluetooth protocol, a control message, wherein the control message includes an instruction that the voice-controlled device to output light according to a light pattern; and
    causing the multiple light sources to output light according to the light pattern.

4. A method comprising:
    generating, by one or more processors of a voice-enabled device, first audio data representing a speech utterance captured by a microphone of the voice-enabled device, the voice-enabled device being disposed in an interior of a vehicle and communicatively coupled to a vehicle computing device associated with the vehicle;
    sending, via a personal area network (PAN) and using a first communication protocol, the first audio data to a user device disposed in the interior of the vehicle, wherein the user device sends the first audio data to a remote speech-processing system;
    receiving, from the user device, via the PAN, and using a second communication protocol, second audio data associated with an intent of the speech utterance; and
    sending, from the voice-enabled device and to the vehicle computing device, the second audio data.

5. The method of claim 4, wherein:
sending the first audio data to the user device using the first communication protocol comprises sending the first audio data using a Bluetooth Low Energy Profile (BLE) of a Bluetooth protocol, wherein the user device is configured to send the first audio data over a wide area network (WAN) to a remote speech-processing system; and
receiving the second audio data from the user device using the second communication protocol comprises receiving music audio data using an Advanced Audio Distribution Profile (A2DP) of the Bluetooth protocol, wherein the music audio data is associated with an intent of the speech utterance.

6. The method of claim 4, wherein:
sending the first audio data to the user device using the first communication protocol comprises sending the first audio data using a Bluetooth Low Energy Profile (BLE) of a Bluetooth protocol; and
receiving the second audio data from the user device using the second communication protocol comprises receiving call audio data using a Hands-Free Profile (HFP) of the Bluetooth protocol.

7. The method of claim 6, wherein the speech utterance comprises a first speech utterance, the call audio data comprises first call audio data, and the method further comprising:
capturing, by the voice-enabled device, a second speech utterance;
generating, by the voice-enabled device, second call audio data representing the second speech utterance; and
sending, from the voice-enabled device and to the user device using the HFP of the Bluetooth protocol, the second call audio data.

8. The method of claim 4, wherein sending, from the user device and to the vehicle computing device, the second audio data comprises at least one of:
sending, via a physical connection between the voice-enabled device and the vehicle computing device, music audio data to the vehicle computing device; or
sending, via the physical connection, call audio data to the vehicle computing device.

9. The method of claim 4, further comprising outputting, by a loudspeaker of the voice-enabled computing device, audio represented by the second audio data, wherein the audio comprises an auditory icon indicating that voice-enabled device detected the speech utterance.

10. The method of claim 4, wherein:
the speech utterance comprises a first speech utterance;
the user device is configured to send the first audio data over a wide area network (WAN) to a remote speech-processing system; and
receiving the second audio data from the user device using the second communication protocol comprises receiving the second audio data using an Advanced Audio Distribution Profile (A2DP) of a Bluetooth protocol, wherein the second audio data represents a second speech utterance comprising one or more machine-generated words that are responsive to the first speech utterance.

11. The method of claim 4, further comprising, prior to sending the first audio data to the user device:
determining, using automatic speech recognition (ASR), that the speech utterance represented by the first audio data includes a wake word; and
at least partly in response to determining that the speech utterance includes the wake word, sending the first audio data to the user device using a Bluetooth Low Energy Profile (BLE) of a Bluetooth protocol.

12. A computing device comprising:
a microphone;
a loudspeaker;
one or more processors;
computer-readable media storing computer-executable instructions that, when executed by the one or more processors, cause the one or more processors to perform operations comprising:
capturing, by the microphone, a speech utterance in an environment of the microphone, the computing device being disposed in an interior of a vehicle including a vehicle computing device, the vehicle computing device coupled to one or more loudspeakers;
generating, by the one or more processors of the computing device, first audio data representing the speech utterance;
sending, using a first communication protocol, the first audio data to a user device for sending to a remote speech-processing system, the user device being disposed in the interior of the vehicle;
receiving, from the user device and using the first communication protocol, an indication of a command included in the speech utterance, wherein the command is associated with an intent of the speech utterance;
identifying second audio data associated with the command; and
outputting, by the loudspeaker, audio corresponding to the second audio data, wherein the user device is sending third audio data to the vehicle computing device using a second communication protocol.

13. The computing device of claim 12, the operations further comprising:
determining, based at least in part on the indication of the command included in the speech utterance, that the second audio data represents an auditory icon associated with capturing the speech utterance; and
wherein identifying the second audio data comprises identifying a location in memory of the computing device at which the second audio data is stored.

14. The computing device of claim 12, the operations further comprising receiving the second audio data from the user device, wherein the second audio data represents an auditory icon that is associated with the command.

15. The computing device of claim 12, wherein:
the first communication protocol comprises a Bluetooth Low Energy Profile (BLE) of a Bluetooth protocol; and
the second communication protocol comprises at least one of an Advanced Audio Distribution Profile (A2DP) or a Hands-Free Profile (HFP) of the Bluetooth protocol.

16. The computing device of claim 12, further comprising:
a first chipset configured to perform automatic speech recognition on audio data;
a second chipset configured to send and receive data using the first communication protocol and the second communication protocol; and
wherein the operations further comprise, prior to sending the first audio data:
determining, using automatic speech recognition and least partly by the first chipset, that the speech utterance represented by the first audio data includes a wake word; and
based at least in part on the speech utterance including the wake word, determining to use the first communication protocol to send, at least partly using the second chipset, the first audio data to the user device, wherein the first communication protocol comprises a Bluetooth Low Energy Profile (BLE) of a Bluetooth protocol.

17. The computing device of claim 16, the operations further comprising:
prior to sending the first audio data, encoding, at least partly by the first chipset, the first audio data for transmission using the first communication protocol; and wherein the sending the first audio data using the first communication protocol is performed, at least partly, by the second chipset.

18. The computing device of claim 12, wherein the speech utterance comprises a first speech utterance, and the operations further comprising:

receiving, from the user device, fourth audio data representing a second speech utterance generated by the remote speech-processing system, the second speech utterance comprising one or more machine-generated words that are responsive to the first speech utterance; and sending the fourth audio data to the vehicle computing device.

19. The computing device of claim 18, wherein:

the first communication protocol comprises a Bluetooth Low Energy Profile (BLE) of a Bluetooth protocol; and sending the fourth audio data to the vehicle computing device comprises sending the fourth audio data via a physical communication connection between the computing device and the vehicle computing device.

20. The computing device of claim 18, wherein:

the first communication protocol comprises a Bluetooth Low Energy Profile (BLE) of a Bluetooth protocol; and receiving the fourth audio data from the user device comprises receiving the fourth audio data using an Advanced Audio Distribution Profile (A2DP) of the Bluetooth protocol.

* * * * *